US008872859B2

(12) United States Patent
Ko et al.

(10) Patent No.: US 8,872,859 B2
(45) Date of Patent: Oct. 28, 2014

(54) LIQUID CRYSTAL PANEL DRIVING METHOD, AND SOURCE DRIVER AND LIQUID CRYSTAL DISPLAY APPARATUS USING THE METHOD

(75) Inventors: Jae-hong Ko, Seoul (KR); Do-youn Kim, Hwaseong-si (KR); Ho-hak Rho, Yongin-si (KR); Kee-moon Chun, Seongnam-si (KR); Jae-suk Yu, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 783 days.

(21) Appl. No.: 13/024,039

(22) Filed: Feb. 9, 2011

(65) Prior Publication Data

US 2011/0199397 A1 Aug. 18, 2011

(30) Foreign Application Priority Data

Feb. 18, 2010 (KR) ........................ 10-2010-0014728

(51) Int. Cl.
*G09G 5/10* (2006.01)
*G06F 3/038* (2013.01)
*G09G 3/36* (2006.01)

(52) U.S. Cl.
CPC ...... *G09G 3/3688* (2013.01); *G09G 2310/0245* (2013.01); *G09G 2330/023* (2013.01); *G09G 2330/02* (2013.01); *G09G 2330/027* (2013.01); *G09G 2330/026* (2013.01)
USPC .............................. 345/690; 345/212; 345/89

(58) Field of Classification Search
USPC .......................................................... 345/690
See application file for complete search history.

(56) References Cited

U.S. PATENT DOCUMENTS

| | | | | |
|---|---|---|---|---|
| 2008/0084371 | A1* | 4/2008 | Yang et al. | 345/87 |
| 2009/0153538 | A1* | 6/2009 | Nakatani et al. | 345/212 |
| 2010/0164929 | A1* | 7/2010 | Chen et al. | 345/211 |
| 2010/0265277 | A1* | 10/2010 | Takahara | 345/690 |
| 2011/0187457 | A1* | 8/2011 | Hsu et al. | 330/192 |

FOREIGN PATENT DOCUMENTS

| | | | |
|---|---|---|---|
| JP | 2009-037020 | A | 2/2009 |
| JP | 2009-104014 | A | 5/2009 |
| KR | 10-2007-0005238 | A | 1/2007 |

* cited by examiner

*Primary Examiner* — Amare Mengistu
*Assistant Examiner* — Sarvesh J Nadkarni
(74) *Attorney, Agent, or Firm* — Sughrue Mion, PLLC

(57) ABSTRACT

Provided are a method of driving a liquid crystal panel which prevents unintended digital image data from being displayed on a liquid crystal panel when power is provided or interrupted, and a source driver and a liquid crystal display apparatus. The source driver includes output buffers; output pads; and a switching unit which is disposed between the output buffers and the output pads and controls an electrical connection state of the output pads. If a level up or a level down of a power voltage occurs, the switching unit prevents output signals of the output buffers from being transmitted to the liquid crystal panel via corresponding output pads and performs at least one of a charge sharing operation for connecting the output pads to each other and a discharging operation for providing a discharge path from the output pads to a ground terminal, in a preset period.

8 Claims, 19 Drawing Sheets

LIQUID CRYSTAL PANEL DRIVING METHOD, AND SOURCE DRIVER AND LIQUID CRYSTAL DISPLAY APPARATUS USING THE METHOD

CROSS-REFERENCE TO RELATED APPLICATIONS

This application claims priority from Korean Patent Application No. 10-2010-0014728, filed on Feb. 18, 2010, the disclosure of which is incorporated herein in its entirety by reference.

SUMMARY

Apparatuses and methods consistent with exemplary embodiments relate to driving a liquid crystal display (LCD), and more particularly, to driving a liquid crystal panel capable of preventing unintended digital image data from being displayed on a liquid crystal panel when power is provided or interrupted, a source driver and an LCD apparatus including the source driver.

One or more exemplary embodiments provide a liquid crystal panel driving method capable of preventing unintended digital image data from being displayed when power is provided or interrupted.

One or more exemplary embodiments also provide a source driver using the liquid crystal panel driving method.

One or more exemplary embodiments also provide an LCD apparatus using the liquid crystal panel driving method.

According to an aspect of an exemplary embodiment, there is provided a method of driving a liquid crystal panel, the method including: performing a sensing operation for sensing a level up or a level down of a power voltage and generating a reset signal; and performing a discharging operation which comprises: preventing an analog grayscale signal from being applied to pixel cells of the liquid crystal panel; and performing at least one of an operation for sharing charges between the pixel cells of the liquid crystal panel and an operation for discharging the charges of the pixel cells of the liquid crystal panel to a ground terminal, in a reference period in response to the reset signal.

According to an aspect of another exemplary embodiment, there is provided a source driver for driving source lines of a liquid crystal panel, the source driver including: a plurality of output buffers; a plurality of output pads which are connected to the liquid crystal panel; and a switching unit which is disposed between the plurality of output buffers and the plurality of output pads and controls an electrical connection state of the plurality of output pads, wherein, if a level up or a level down of a power voltage occurs, the switching unit prevents output signals of the plurality of output buffers from being transmitted to the liquid crystal panel via corresponding output pads and performs at least one of a charge sharing operation for connecting the plurality of output pads to each other and a discharging operation for providing a discharge path from the plurality of output pads to a ground terminal, in a preset period.

According to an aspect of another exemplary embodiment, there is provided an LCD apparatus including: a liquid crystal panel in which a plurality of gate lines and a plurality of source lines perpendicularly cross each other and a liquid crystal cell having a switching device is formed in each of regions where the plurality of gate lines and the plurality of source lines cross each other; a gate driver which sequentially applies a scan signal to the plurality of gate lines; a source driver which generates analog grayscale signals corresponding to received digital image data and applies the analog grayscale signals to the plurality of source lines; and a timing controller which transmits the digital image data to the source driver and controls the gate driver and the source driver, wherein the source driver includes a plurality of output buffers; a plurality of output pads connected to the plurality of source lines of the liquid crystal panel; and a switching unit which is disposed between the plurality of output buffers and the plurality of output pads and controls an electrical connection state of the plurality of output pads, and wherein, if a level up or a level down of a power voltage occurs, the switching unit prevents output signals of the plurality of output buffers from being transmitted to the liquid crystal panel via corresponding output pads and performs at least one of a charge sharing operation for connecting the plurality of output pads to each other and a discharging operation for providing a discharge path from the plurality of output pads to a ground terminal, in a preset period.

BRIEF DESCRIPTION OF THE DRAWINGS

Exemplary embodiments will be more clearly understood from the following detailed description taken in conjunction with the accompanying drawings, in which.

DETAILED DESCRIPTION OF EXEMPLARY EMBODIMENTS

Hereinafter, exemplary embodiments will be described in detail with reference to the attached drawings.

Figure 1:
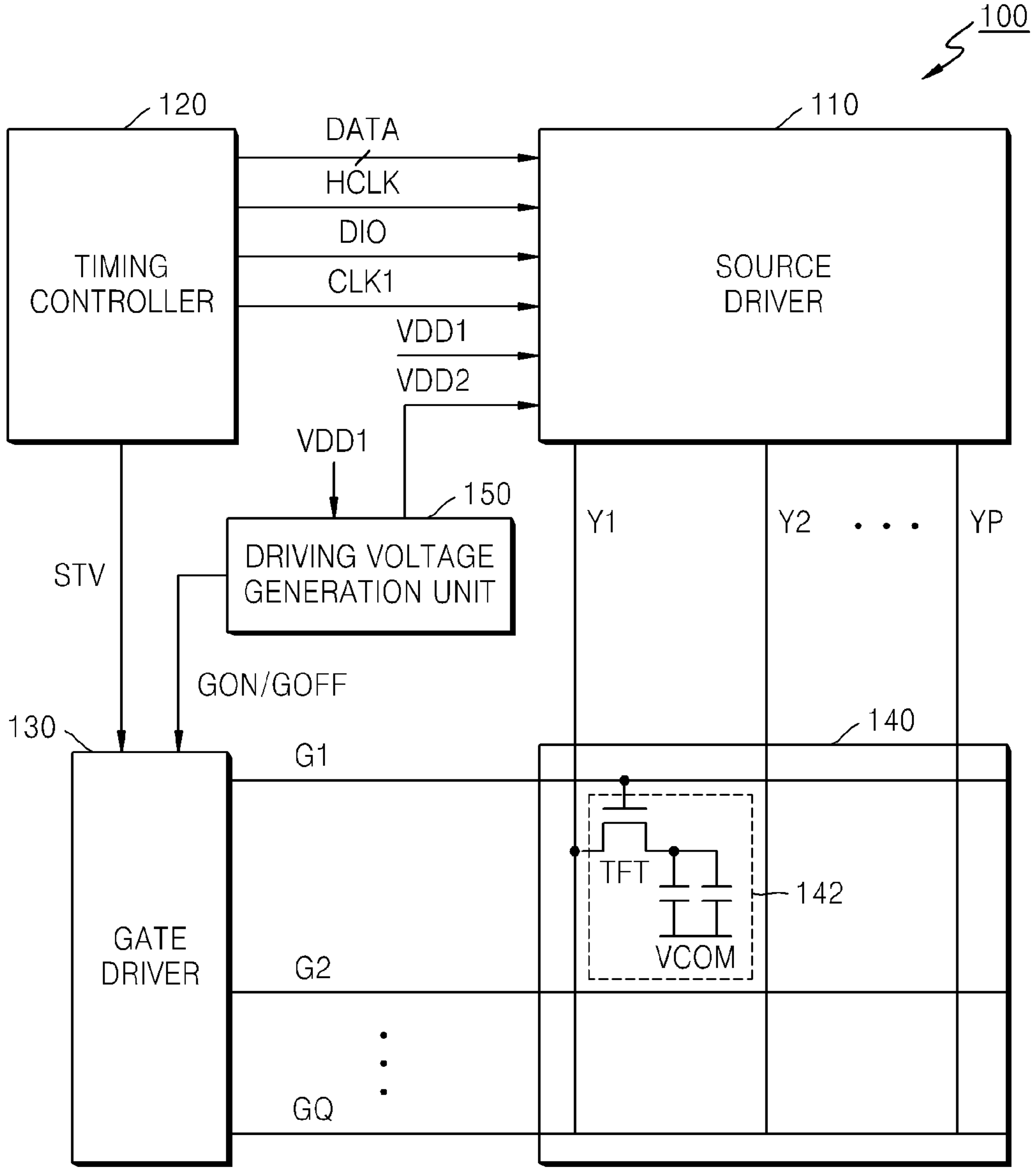
FIG. 1 is a block diagram of an LCD apparatus.

FIG. 1 is a block diagram of an LCD apparatus 100. Referring to FIG. 1, the LCD apparatus 100 includes a liquid crystal panel 140, a gate driver 130 for sequentially activating gate lines G1 through GQ of the liquid crystal panel 140, a source driver 110 for applying an analog grayscale signal to source lines Y1 through YP of the liquid crystal panel 140, a driving voltage generation unit 150 for generating a necessary driving voltage by using an external voltage, and a timing controller 120 for controlling operation timings of the source driver 110 and the gate driver 130. When power is provided to the LCD apparatus 100, the timing controller 120 receives digital image data DATA to be displayed on the liquid crystal panel 140 from an external device, and processes and provides the digital image data DATA to the source driver 110. The source driver 110 receives the digital image data DATA provided from the timing controller 120, generates an analog grayscale signal corresponding to the digital image data DATA, and applies the analog grayscale signal to the source lines Y1 through YP of the liquid crystal panel 140. The analog grayscale signal applies an electric field to liquid crystal cells 142 of the liquid crystal panel 140 and thus optical properties, i.e., light transmittances, of the liquid crystal cells 142 are adjusted, thereby displaying desired data on the liquid crystal panel 140.

However, when power is provided to the LCD apparatus 100, a vertical stripe image is abnormally displayed. Also, when the power provided to the LCD apparatus 100 is interrupted, the vertical stripe image is abnormally displayed and then disappears. Furthermore, when the LCD apparatus 100 is powered on immediately after being powered off, the same phenomenon occurs. The vertical stripe image is not supposed to be displayed and thus causes unnecessary power consumption and also causes image quality deterioration of the LCD apparatus 100. Accordingly, a solution for preventing an unintended image from being abnormally displayed when power is provided to the LCD apparatus 100 or the power is interrupted is required.

Figure 2:
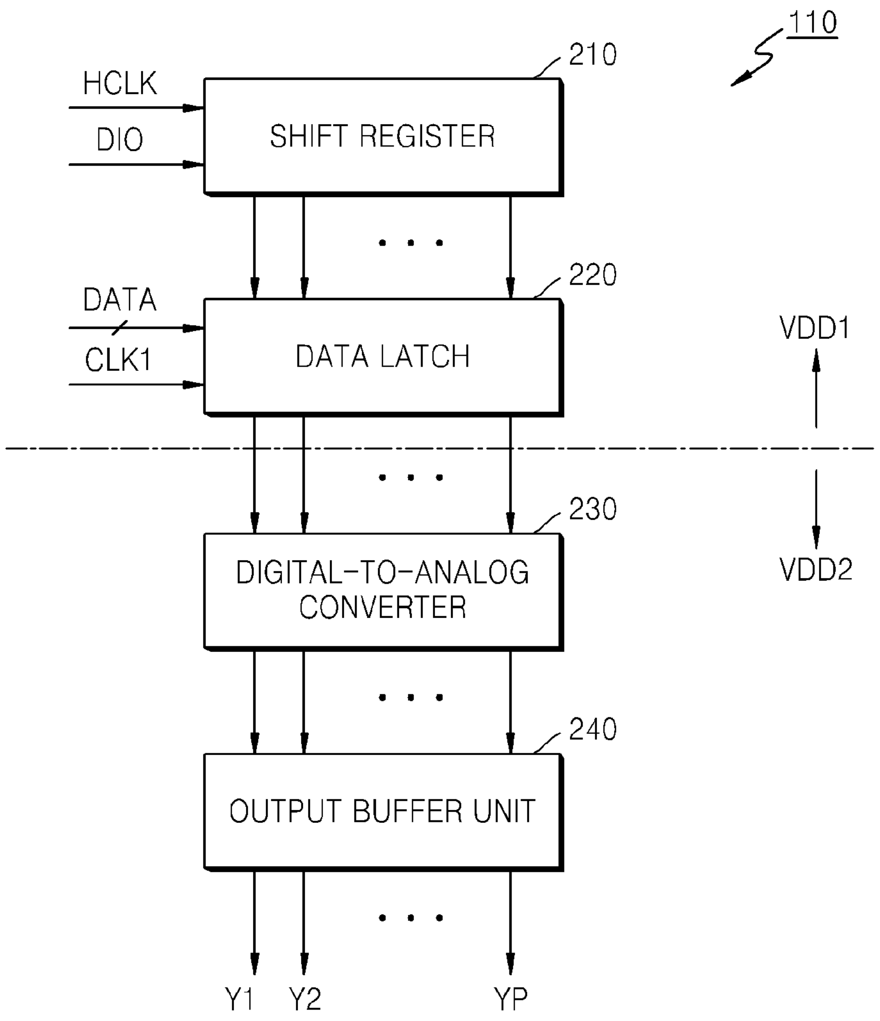
FIG. 2 is a block diagram of a source driver illustrated in FIG. 1.

FIG. 2 is a block diagram of the source driver 110 illustrated in FIG. 1. Referring to FIG. 2, the source driver 110 includes a shift register 210 and a data latch 220 which are driven by a first power voltage VDD1, and also includes a digital-to-analog converter (DAC) 230 and an output buffer unit 240 which are driven by a second power voltage VDD2 that is higher than the first power voltage VDD1.

The shift register 210 controls a timing when digital image data DATA is sequentially stored in the data latch 220. The data latch 220 receives and stores the digital image data DATA in response to a horizontal start signal DIO that is shifted and output, and outputs the stored digital image data DATA in response to an output control signal CLK1 if one horizontal line of the digital image data DATA is completely stored. The DAC 230 receives the digital image data DATA output from the data latch 220, and outputs analog grayscale signals corresponding to the digital image data DATA in response to the output control signal CLK1. The output buffer unit 240 buffers and outputs the analog grayscale signals output from the DAC 230.

Figure 3:
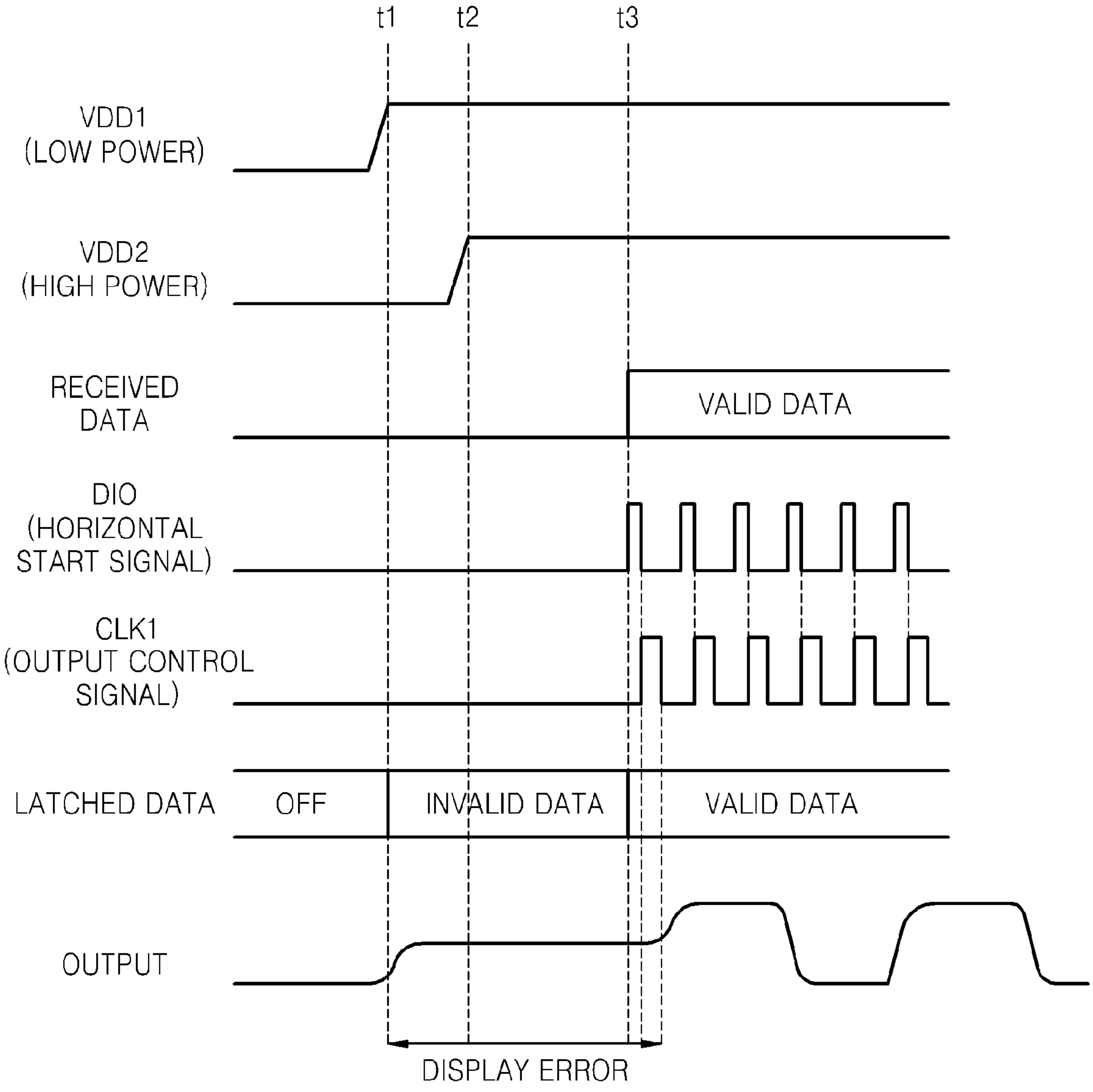
FIG. 3 is a timing diagram showing when the LCD apparatus illustrated in FIG. 1 enters a power-on state.

FIG. 3 is a timing diagram showing when the LCD apparatus 100 illustrated in FIG. 1 enters a power-on state. Referring to FIGS. 1, 2, and 3, when power is provided to the LCD apparatus 100, the first power voltage VDD1 and the second power voltage VDD2 are provided to the source driver 110. The first power voltage VDD1 is a low power voltage for driving a logic circuit of the source driver 110, and the second power voltage VDD2 is a high power voltage for driving an analog circuit of the source driver 110. The LCD apparatus 100 internally generates the second power voltage VDD2 by using the first power voltage VDD1 provided from an external device. Accordingly, the first power voltage VDD1 is initially stabilized at a time t1, and then, the second power voltage VDD2 is stabilized at a time t2. The digital image data DATA is transmitted to the source driver 110 after a certain period of time from when the first power voltage VDD1 and the second power voltage VDD2 are stabilized. In more detail, the digital image data DATA, the horizontal start signal DIO for controlling a data latch timing of the source driver 110, and the output control signal CLK1 for controlling an output timing of an analog grayscale signal start to be transmitted from the timing controller 120 to the source driver 110 at a time t3. The output control signal CLK1 controls a timing for applying an analog grayscale signal corresponding to the digital image data DATA stored in the data latch 220 of the source driver 110, to the source lines Y1 through YP of the liquid crystal panel 140. When the output control signal CLK1 is in a low level, the source driver 110 applies the analog grayscale signal to the liquid crystal panel 140. In a period between the timings t1 and t3, the source driver 110 does not receive the digital image data DATA from the timing controller 120 and the output control signal CLK1 is in a low level so that unknown data stored in the data latch 220 of the source driver 110 is displayed on the liquid crystal panel 140. As such, a vertical stripe image is displayed on the liquid crystal panel 140, and thus, a display error occurs. In general, a difference exists between a timing when the timing controller 120 applies a signal for providing power to the LCD apparatus 100 and a timing when the timing controller 120 applies a signal for validly providing the digital image data DATA to the source driver 110, whereas a degree of the difference may differ according to the type of the timing controller 120. Accordingly, in order to prevent unknown data from being displayed on the liquid crystal panel 140 when power is provided to the LCD apparatus 100, regardless of the type of the timing controller 120, an output of the source driver 110 has to be prevented from being transmitted to the liquid crystal panel 140 until valid data is provided to the source driver 110.

Figure 4:
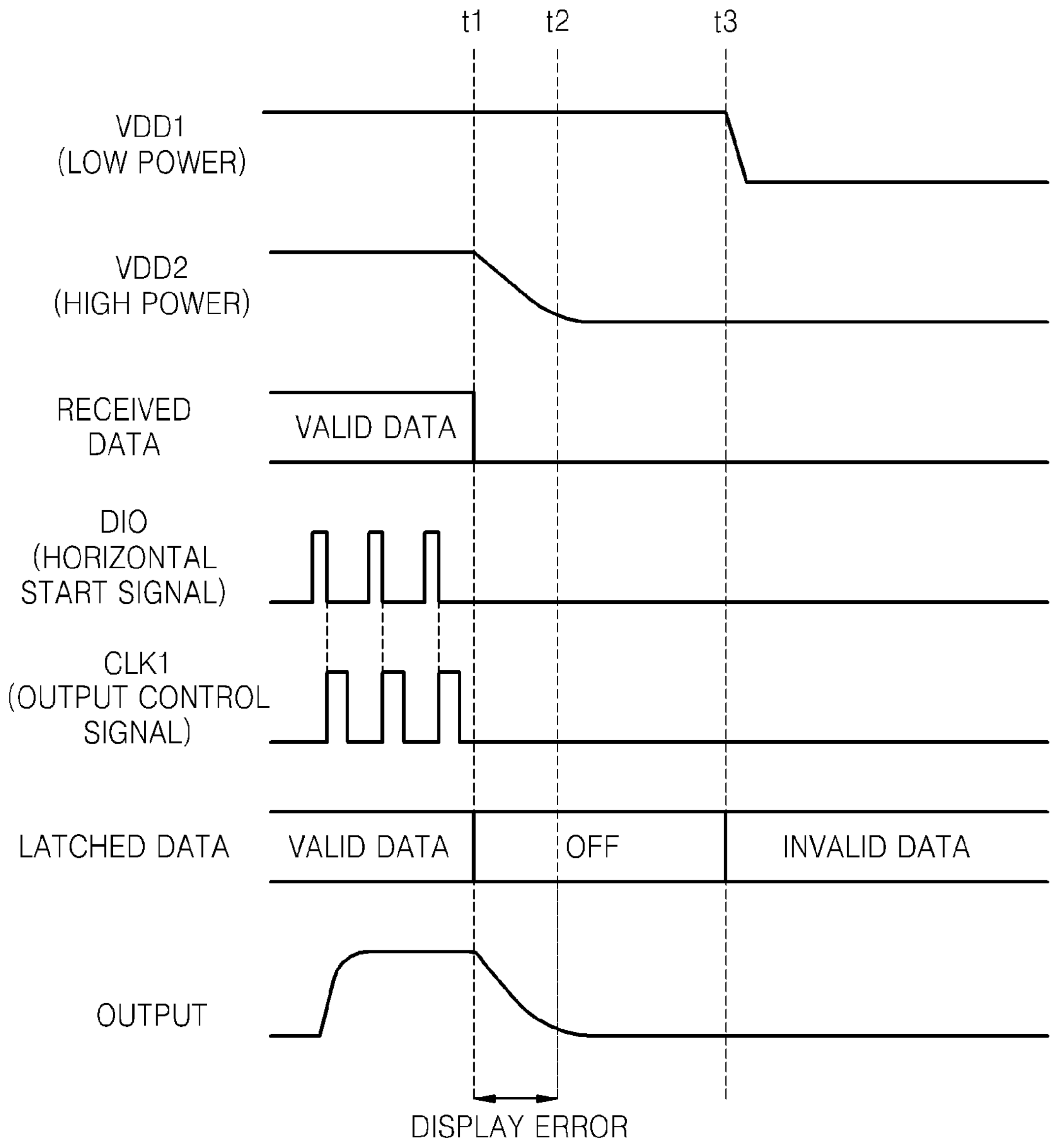
FIG. 4 is a timing diagram showing when the LCD apparatus illustrated in FIG. 1 enters a power-off state.

FIG. 4 is a timing diagram showing when the LCD apparatus 100 illustrated in FIG. 1 enters a power-off state. Referring to FIGS. 1, 2, and 4, power provided to the LCD apparatus 100 is interrupted at a time t1. In more detail, the second power voltage VDD2, which is a high power voltage, initially starts to drop at the time t1, and then, the first power voltage VDD1, which is a low power voltage, starts to drop at a time t3. After the time t1, the digital image data DATA, the horizontal start signal DIO for controlling a data latch timing of the source driver 110, and the output control signal CLK1 for controlling an output timing of an analog grayscale signal are not transmitted from the timing controller 120 to the source driver 110.

The second power voltage VDD2 provided to the source driver 110 starts to drop at the time t1 with a smooth slope and converges to a ground level at a time t2. Consequently, although the power is interrupted at the time t1, the second power voltage VDD2 does not completely drop to the ground level until the time t2. In a period between the times t1 and t2, the source driver 110 does not latch the digital image data DATA since the horizontal start signal DIO is in a low level, but data stored in the data latch 220 is displayed on the liquid crystal panel 140 because the output control signal CLK1 is in a low level. As such, the source driver 110 displays unknown data, stored in the data latch 220, on the liquid crystal panel 140 in the period between the times t1 and t2, and thus, an unintended vertical stripe image is displayed. Accordingly, unknown data has to be prevented from being displayed on the liquid crystal panel 140 in a power-off state as well as in a power-on state.

Although unknown data is prevented from being displayed on the liquid crystal panel 140 in the period between the times t1 and t2, charges formed in the liquid crystal cells 142 of the liquid crystal panel 140 before the time t1 when the power is interrupted may cause a residual image. When the power provided to the LCD apparatus 100 is interrupted (power-off), a voltage charged in the liquid crystal cells 142 of the liquid crystal panel 140 is smoothly discharged because the voltage charged in the liquid crystal cells 142 gradually converges to a ground potential due to a leakage current of a thin film transistor that is turned off. Accordingly, in the power-off state, charges remaining in the liquid crystal cells 142 have to be rapidly discharged while preventing unknown data from being displayed on the liquid crystal panel 140.

Figure 5:
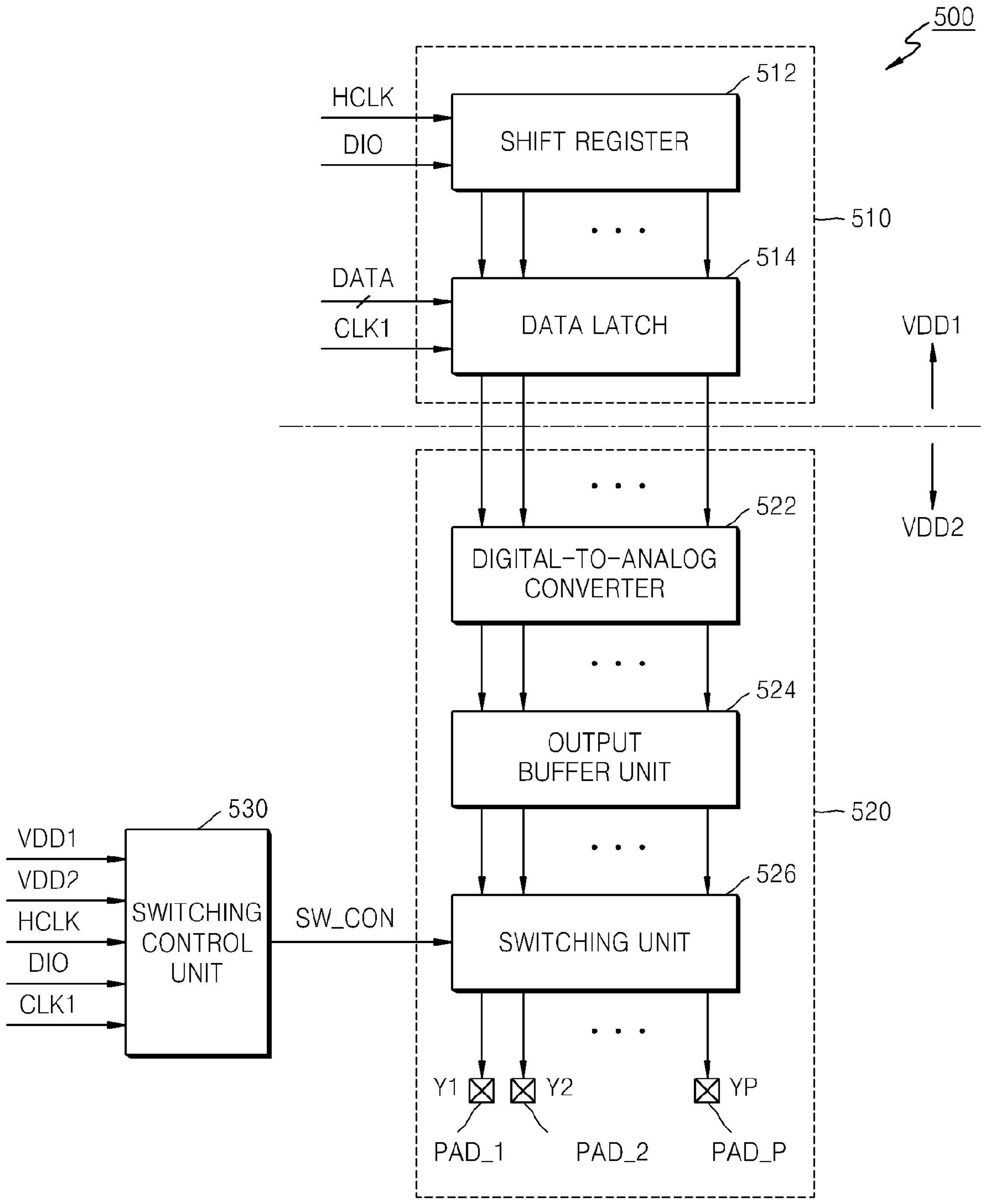
FIG. 5 is a block diagram of a source driver according to an exemplary embodiment.

FIG. 5 is a block diagram of a source driver 500 according to an exemplary embodiment. Referring to FIG. 5, the source driver 500 includes a digital data reception unit 510 and an analog grayscale signal output unit 520. The digital data reception unit 510 is driven by the first power voltage VDD1 and includes a shift register 512 and a data latch 514. The analog grayscale signal output unit 520 is driven by the second power voltage VDD2 that is higher than the first power voltage VDD1 and includes a DAC 522, an output buffer unit 524, a switching unit 526, and a plurality of output pads PAD_1 through PAD_P.

The shift register 512 controls a timing when digital image data DATA is sequentially stored in the data latch 514. The shift register 512 shifts a horizontal start signal DIO received in response to a clock signal HCLK. The digital image data DATA transmitted from a timing controller (e.g., 120 in FIG. 1) is stored in the data latch 514 in response to the horizontal start signal DIO that is sequentially shifted and output.

The data latch 514 receives and stores the digital image data DATA in response to the shifted and output horizontal start signal DIO, and outputs the stored digital image data DATA in response to an output control signal CLK1 if one horizontal line of the digital image data DATA is completely stored.

The DAC 522 receives the digital image data DATA output from the data latch 514, and outputs analog grayscale signals corresponding to the digital image data DATA in response to the output control signal CLK1.

The output buffer unit 524 buffers and outputs the analog grayscale signals output from the DAC 522.

The output pads PAD_1 through PAD_P are connected to source lines of a liquid crystal panel (not shown) outside the source driver 500. Accordingly, the analog grayscale signals buffered by and output from the output buffer unit 524 are correspondingly applied to the source lines of the liquid crystal panel via the output pads PAD_1 through PAD_P.

The switching unit 526 blocks the connection between the output buffer unit 524 and the output pads PAD_1 through PAD_P until valid data may be displayed on the liquid crystal panel when power is provided (power-on). When power is interrupted (power-off), the switching unit 526 also blocks the connection between the output buffer unit 524 and the output pads PAD_1 through PAD_P, so that invalid data is prevented from being displayed on the liquid crystal panel. Also, while the connection between the output buffer unit 524 and the output pads PAD_1 through PAD_P is blocked, the switching unit 526 connects the source lines of the liquid crystal panel to each other so as to perform charge sharing and discharge charges remaining in liquid crystal cells of the liquid crystal panel to a ground voltage.

The source driver 500 may further include a switching control unit 530 for controlling the switching unit 526. The switching control unit 530 senses whether the power is provided (power-on) or interrupted (power-off), and generates a switching control signal SW_CON for controlling the switching unit 526 in response to control signals generated by the timing controller in order to control the source driver 500, for example, the clock signal HCLK, the horizontal start signal DIO, and the output control signal CLK1.

Figure 6:
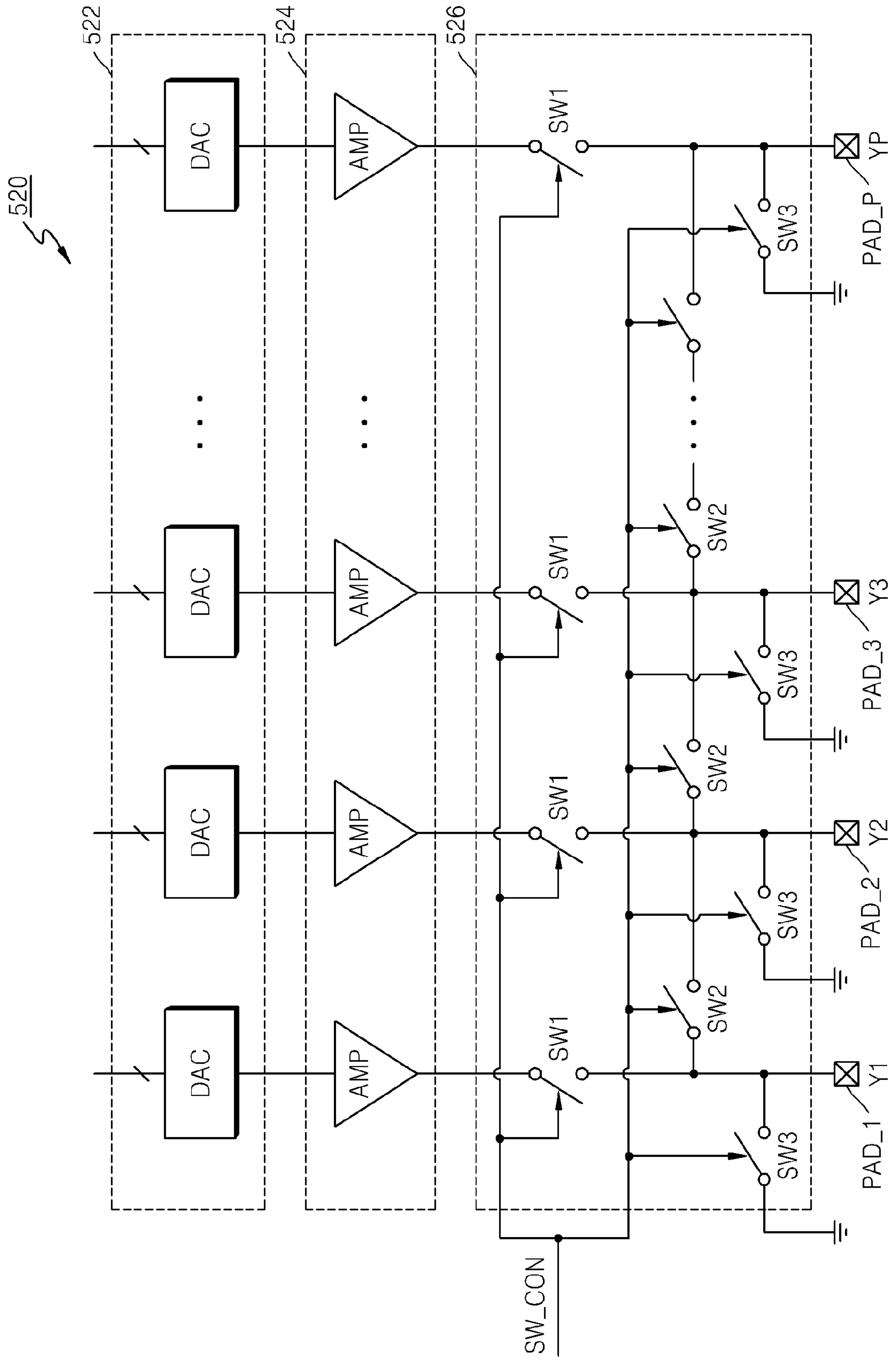
FIG. 6 is a circuit diagram of an analog grayscale signal output unit illustrated in FIG. 5, according to an exemplary embodiment.

FIG. 6 is a circuit diagram of the analog grayscale signal output unit 520 illustrated in FIG. 5, according to an exemplary embodiment. Referring to FIG. 6, the analog grayscale signal output unit 520 includes the DAC 522, the output buffer unit 524, the switching unit 526, and the output pads PAD_1 through PAD_P. The DAC 522 includes a plurality of digital-analog converters (DACs) DAC_1 through DAC_P. The output buffer unit 524 includes a plurality of amplifiers AMP_1 through AMP_P. The switching unit 526 includes a plurality of output switches SW1 for correspondingly connecting or blocking the output pads PAD_1 through PAD_P and the amplifiers AMP_1 through AMP_P to or from each other in response to a switching control signal SW_CON, a plurality of charge sharing switches SW2 for connecting or blocking the output pads PAD_1 through PAD_P to or from each other in response to the switching control signal SW_CON, and a plurality of discharge switches SW3 for discharging charges of liquid crystal cells of a liquid crystal panel (not shown) connected to the output pads PAD_1 through PAD_P, to a ground voltage in response to the switching control signal SW_CON. Although FIG. 6 exemplarily shows that all of the output, charge sharing, and discharge switches SW1, SW2, and SW3 are controlled in response to the switching control signal SW_CON, the current exemplary embodiment is not limited thereto. For example, the output, charge sharing, and discharge switches SW1, SW2, and SW3 may be independently controlled in response to different control signals. Also, although FIG. 6 exemplarily shows that the discharge switches SW3 are connected to the output pads PAD_1 through PAD_P in one-to-one correspondence, the current exemplary embodiment is not limited thereto. As long as charge sharing and discharge are performed together, the number of discharge switches SW3 may be at least one and may be freely changed according to the electrical properties of the discharge switches SW3.

Figure 7A:
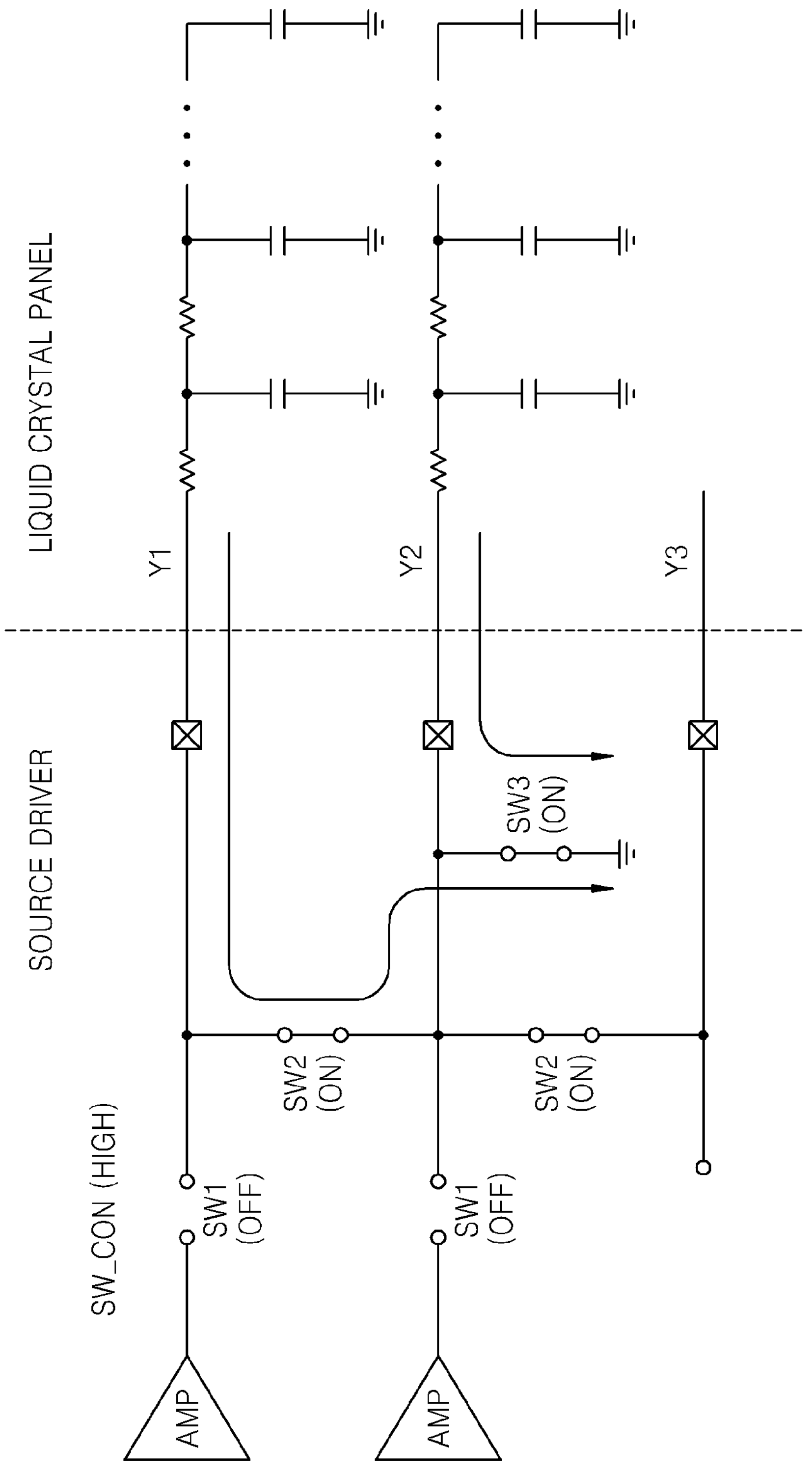
FIGS. 7A and 7B are circuit diagrams showing a switching operation of the source driver illustrated in FIG. 5, according to an exemplary embodiment.
Figure 7B:
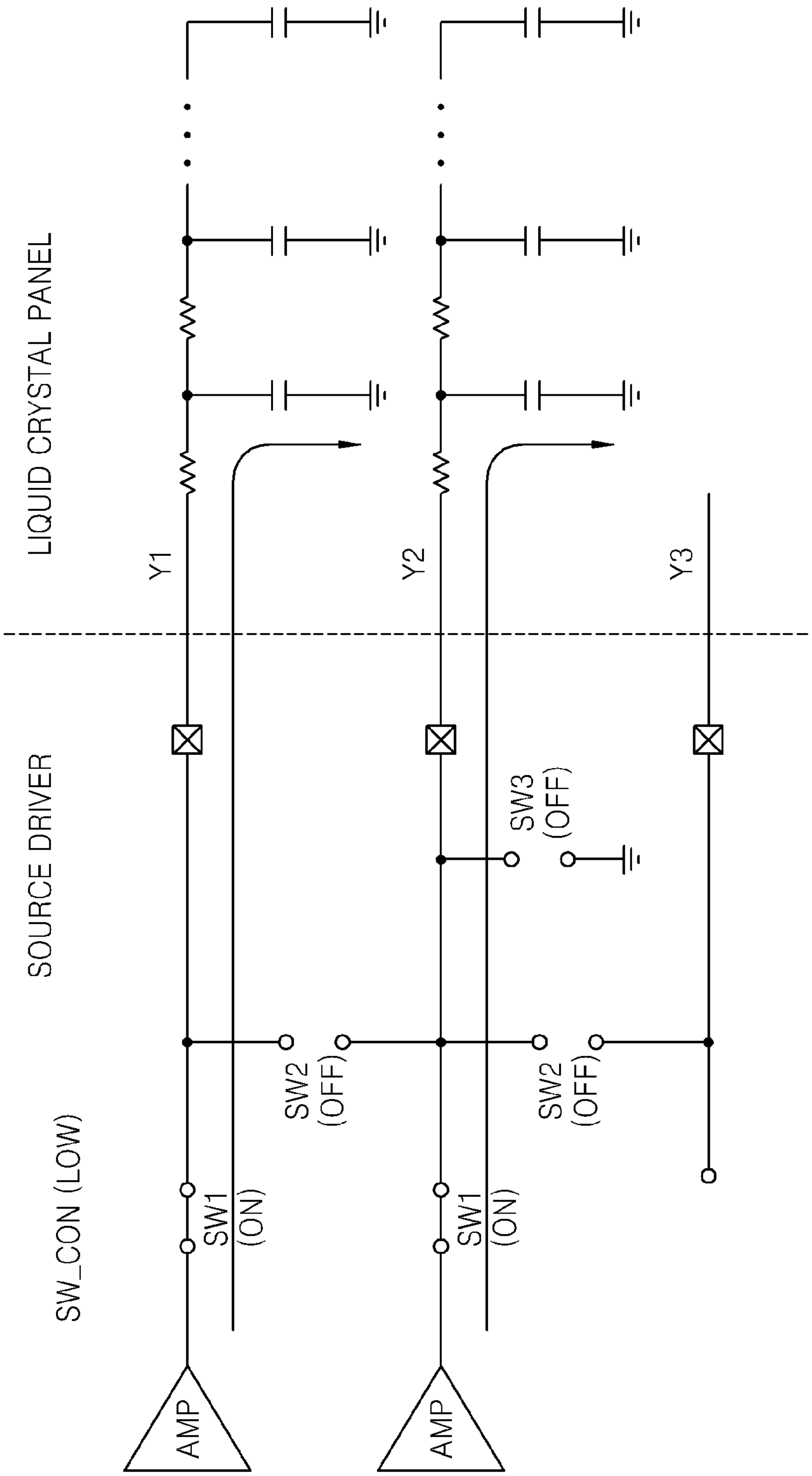

FIGS. 7A and 7B are circuit diagrams showing a switching operation of the source driver illustrated in FIG. 5, according to an exemplary embodiment. Referring to FIG. 7A, output switches SW1 are switched off in response to a switching control signal SW_CON in a high level, and charge sharing switches SW2 and a discharge switch SW3 are switched on in response to the switching control signal SW_CON in a high level. Thus, the output pads PAD_1 through PAD_P are connected to each other via the charge sharing switches SW2, and charges of liquid crystal cells connected to source lines Y1 through Y3 of a liquid crystal panel are discharged to a ground voltage via the discharge switch SW3.

Referring to FIG. 7B, the charge sharing switches SW2 and the discharge switch SW3 are switched off in response to the switching control signal SW_CON in a low level, and the output switches SW1 are switched on in response to the switching control signal SW_CON in a low level. Thus, output amplifiers AMP have properties corresponding to specifications and forms charges in the liquid crystal cells connected to the source lines Y1 through Y3 of the liquid crystal panel.

Figure 8:
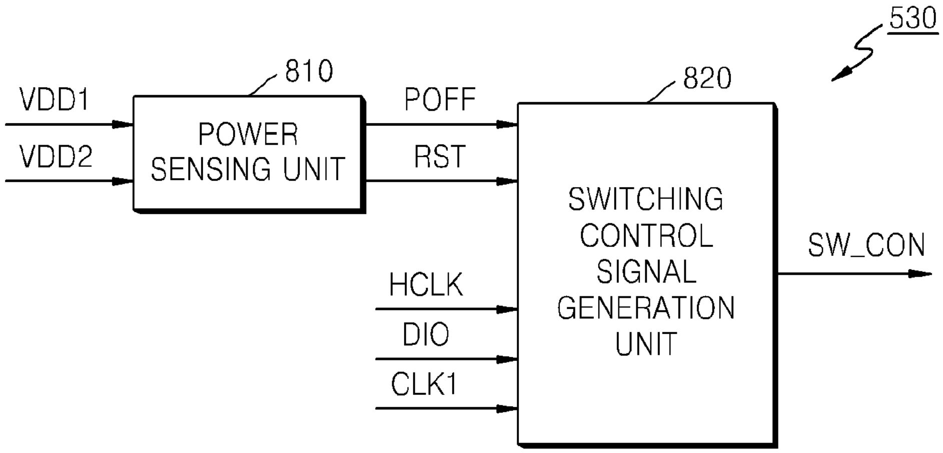
FIG. 8 is a block diagram of a switching control unit illustrated in FIG. 5, according to an exemplary embodiment.

FIG. 8 is a block diagram of the switching control unit 530 illustrated in FIG. 5, according to an exemplary embodiment. Referring to FIG. 8, the switching control unit 530 includes a power sensing unit 810 and a switching control signal generation unit 820. The power sensing unit 810 checks whether power is provided or interrupted, and transmits an off sensing signal POFF and a reset signal RST to the switching control signal generation unit 820. The reset signal RST may be toggled once if power is provided or interrupted. The off sensing signal POFF may be toggled once if power is interrupted.

The switching control signal generation unit 820 receives the off sensing signal POFF and the reset signal RST transmitted from the power sensing unit 810, and generates a switching control signal SW_CON in response to a clock signal HCLK, a horizontal start signal DIO, and an output control signal CLK1 transmitted from a timing controller (e.g., 120 in FIG. 1).

Figure 9:
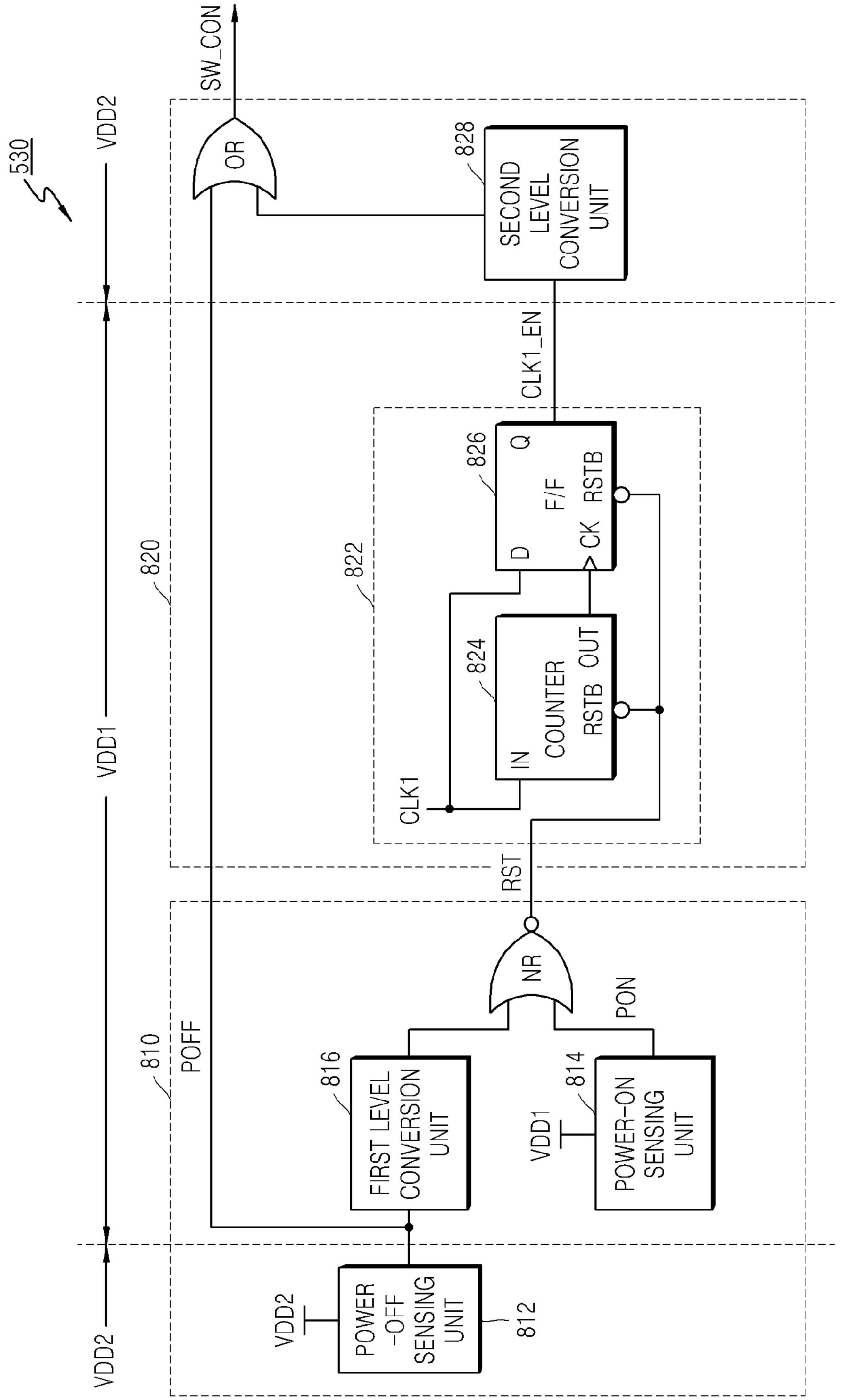
FIG. 9 is a circuit diagram of the switching control unit illustrated in FIG. 8, according to an exemplary embodiment.

FIG. 9 is a circuit diagram of the switching control unit 530 illustrated in FIG. 8, according to an exemplary embodiment. Referring to FIG. 9, the switching control unit 530 includes the power sensing unit 810 and the switching control signal generation unit 820.

The power sensing unit 810 checks whether power is provided or interrupted, and transmits an off-sensing signal POFF and a reset signal RST to the switching control signal generation unit 820. In more detail, the power sensing unit 810 may include a power-off sensing unit 812 driven by the second power voltage VDD2, a power-on sensing unit 814, a first level conversion unit 816, and a NOR gate NR which are driven by the first power voltage VDD1. The power-on sensing unit 814 generates an on-sensing signal PON in response to a level up of the first power voltage VDD1. When power is provided and an LCD apparatus (not shown) enters a power-on state, since the second power voltage VDD2 is generated by using the first power voltage VDD1, the level of the first power voltage VDD1 is increased first. Accordingly, the power-on sensing unit 814 senses the level up of the first power voltage VDD1 and generates the on-sensing signal PON in a high level. The power-off sensing unit 812 generates the off-sensing signal POFF in response to a level down of the second power voltage VDD2. When the LCD apparatus enters a power-off state, the power-off sensing unit 812 senses the level down of the second power voltage VDD2 and generates the off-sensing signal POFF in a high level. Since the power-off sensing unit 812 is driven by the second power voltage VDD2, the voltage level of the off-sensing signal POFF is higher than that of the on-sensing signal PON generated by the power-on sensing unit 814 and driven by the first power voltage VDD1. The first level conversion unit 816 lowers the voltage level of the off-sensing signal POFF to the voltage level of the on-sensing signal PON. The NOR gate NR performs a NOR operation on the level-inverted off-sensing signal POFF and the on-sensing signal PON, and outputs the reset signal RST. Accordingly, the power sensing unit 810 outputs the reset signal RST in a low level when the LCD apparatus enters a power-on state and when the LCD apparatus enters a power-off state.

The switching control signal generation unit 820 receives the off-sensing signal POFF and the reset signal RST transmitted from the power sensing unit 810, and generates a switching control signal SW_CON in response to an output control signal CLK1 transmitted from a timing controller (not shown). In more detail, the switching control signal generation unit 820 may include a detection unit 822, a second level conversion unit 828, and an OR gate OR. The detection unit 822 is initialized in response to the reset signal RST output from the power sensing unit 810, and inverts the level of a detection signal CLK1_EN if the output control signal CLK1 is toggled a preset number of times. For example, if the detection signal CLK1_EN is set to be output after the output control signal CLK1 is toggled 16 times, the detection signal CLK1_EN is initialized to a low level in response to the reset signal RST, and outputs the detection signal CLK1_EN in a high level if the number of times that the output control signal CLK1 is toggled is counted as 16. The detection unit 822 may include a counter 824 and a flip-flop 826. The counter 824 is initialized in response to the reset signal RST in a low level, counts the number of times that an input signal (e.g., CLK_1) is toggled, and controls a previous output level to be inverted if the input signal is toggled a preset number of times. The flip-flop 826 is initialized in response to the reset signal RST in a low level, and latches a value provided to a data input terminal in response to an output of the counter 824, which is input to a clock terminal. The flip-flop 826 may be formed to invert the previous output level in response to level transition of the output of the counter 824. Accordingly, although FIG. 9 shows that the flip-flop 826 applies the output control signal CLK1, to be toggled, to a data input terminal, the first power voltage VDD1 may be provided to the data input terminal in order to sufficiently ensure margins of a set-up time and a hold time. The second level conversion unit 828 inverts the voltage level of the detection signal CLK1_EN and outputs the detection signal CLK1_EN. Since the detection unit 822 is driven by the first power voltage VDD1, the voltage level of the detection signal CLK1_EN is lower than that of the second power voltage VDD2. In FIG. 5, since the switching unit 526 controlled in response to the switching control signal SW_CON is included in the analog grayscale signal output unit 520 driven by the second power voltage VDD2, the voltage level of the detection signal CLK1_EN has to be raised to the level of the second power voltage VDD2. The OR gate OR performs an OR operation on the off-sensing signal POFF generated by the power-off sensing unit 812 and the output of the second level conversion unit 828, and generates the switching control signal SW_CON. For example, the switching control signal SW_CON in a low level is output if the output control signal CLK1 is toggled a preset number of times after the LCD apparatus enters a power-off state or a power-on state.

Although FIG. 9 shows for convenience of explanation that the switching control signal generation unit 820 counts the number of times that the output control signal CLK1 is toggled, from among a plurality of control signals generated by the timing controller in order to control the source driver, the number and the type of control signals of which the number of times that toggling is performed is counted are not limited to one and the output control signal CLK1.

Figure 10:
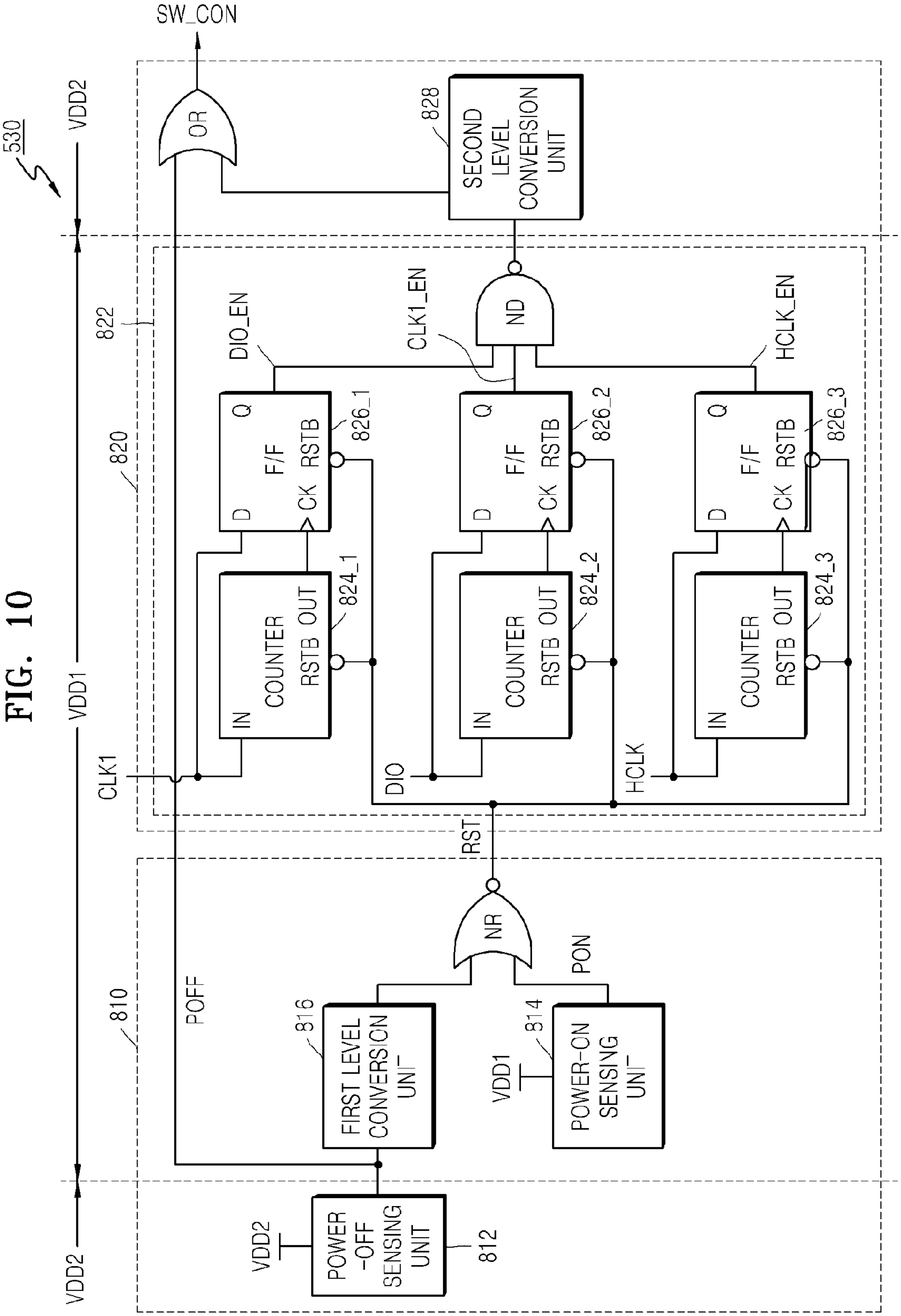
FIG. 10 is a circuit diagram of the switching control unit illustrated in FIG. 8, according to another exemplary embodiment.

FIG. 10 is a circuit diagram of the switching control unit 530 illustrated in FIG. 8, according to another exemplary embodiment. Referring to FIG. 10, the switching control unit 530 includes the power sensing unit 810 and the switching control signal generation unit 820. Unlike FIG. 9, in FIG. 10, the detection unit 822 of the may include counter 824_1 through 824_3 and flip-flops 826_1 through 826_3, and thus, the switching control unit 530 separately counts the numbers of times that three control signals such as an output control signal CLK1, a horizontal start signal DIO, and a clock signal HCLK are toggled using the counters 824_1 through 824_3, respectively. In more detail, a switching control signal SW_CON in a high level is output in response to a reset signal RST, the numbers of times that the output control signal CLK1, the horizontal start signal DIO, and the clock signal HCLK are toggled are separately counted by the counters 824_1, 824_2 and 824_3, respectively, and the switching control signal SW_CON in a low level is output if all of a first detection signal CLK1_EN, a second detection signal DIO_EN, and a third detection signal HCLK_EN are in a high level.

Although FIG. 10 shows for convenience of explanation that the switching control signal generation unit 820 counts the numbers of times that the output control signal CLK1, the horizontal start signal DIO, and the clock signal HCLK are toggled, from among a plurality of control signals generated by the timing controller, in order to control the source driver, the number and the type of control signals of which the numbers of times that toggling is performed are counted are not limited to three, namely, the output control signal CLK1, the horizontal start signal DIO, and the clock signal HCLK.

Figure 11A:
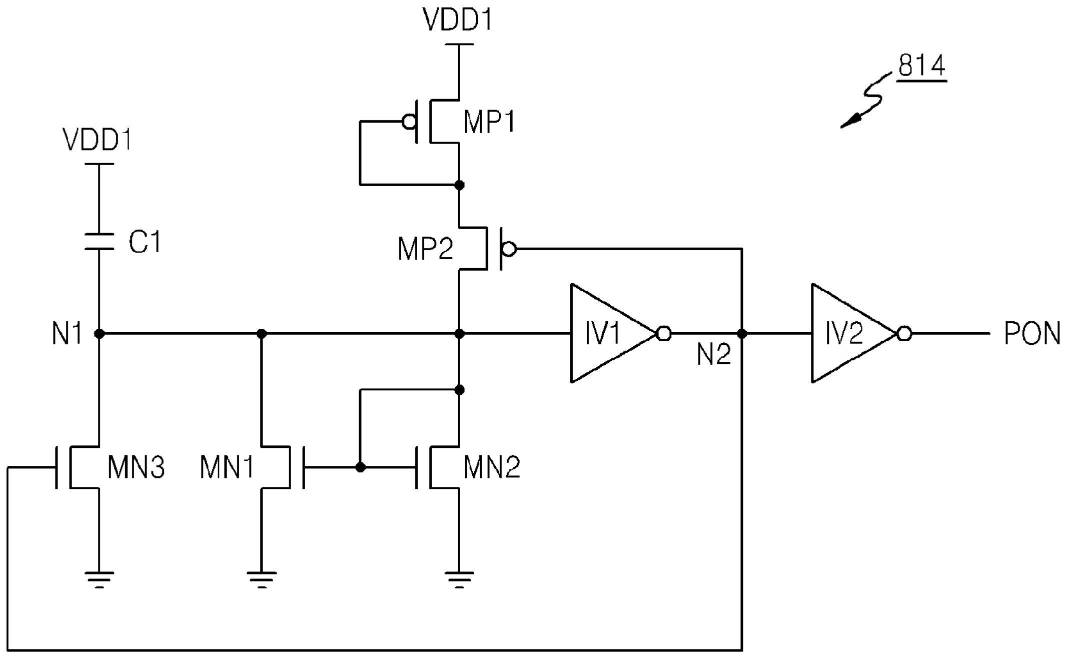
FIG. 11A is a circuit diagram of a power-on sensing unit illustrated in FIG. 10, according to an exemplary embodiment.

FIG. 11A is a circuit diagram of a power-on sensing unit 814 illustrated in FIG. 10, according to an exemplary embodiment. Referring to FIG. 11A, the power-on sensing unit 814 includes a first capacitor C1, first and second p-channel metal-oxide-semiconductor (PMOS) transistors MP1 and MP2, first through third n-channel metal-oxide-semiconductor (NMOS) transistors MN1 through MN3, and first and second inverters IV1 and IV2.

The first capacitor C1 has a first terminal connected to a source of the first power voltage VDD1, and a second terminal connected to a first node N1. The third NMOS transistor MN3 has a first terminal connected to the first node N1, a second terminal that is grounded, and a gate terminal connected to a second node N2. The first PMOS transistor MP1 has a first terminal connected to the source of the first power voltage VDD1, a second terminal connected to a first terminal of the second PMOS transistor MP2, and a gate terminal connected to the second terminal of the first PMOS transistor MP1. The second PMOS transistor MP2 has the first terminal connected to the second terminal of the first PMOS transistor MP1, a second terminal connected to a first terminal of the second NMOS transistor MN2, and a gate terminal connected to the second node N2. The second NMOS transistor MN2 has the first terminal connected to the second terminal of the second PMOS transistor MP2, a second terminal that is grounded, and a gate terminal connected to the first terminal of the second NMOS transistor MN2. The first NMOS transistor MN1 has a first terminal connected to the first node N1, a second terminal that is grounded, and a gate terminal connected to the gate terminal of the second NMOS transistor MN2. The first inverter IV1 inverts a signal of the first node N1 and outputs the inverted signal. The second inverter IV2 inverts a signal of the second node N1 and outputs the inverted signal.

Figure 11B:
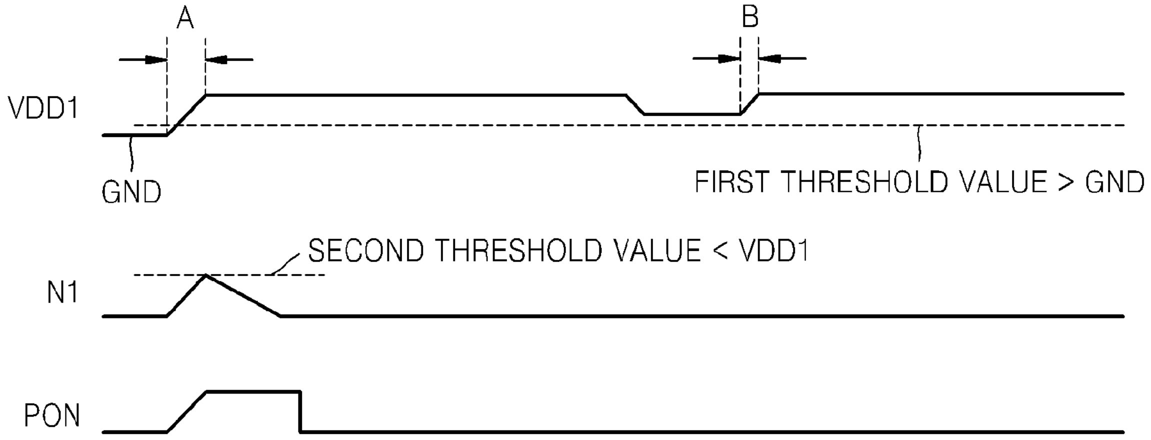
FIG. 11B is a graph showing a simulation result of the power-on sensing unit illustrated in FIG. 11A, according to an exemplary embodiment.

FIG. 11B is a graph showing a simulation result of the power-on sensing unit 814 illustrated in FIG. 11A. Referring to FIG. 11B, the level of the first power voltage VDD1 is increased in periods A and B. Period A is a period when the level of the first power voltage VDD1 is increased from a ground level, for example, an LCD apparatus enters an initial power-on state. Period B is a period when the level of the first power voltage VDD1 is increased from a level higher than a first threshold value, for example, when the LCD apparatus is powered on immediately after being powered off.

In more detail, if the LCD apparatus enters an initial power-on state, and thus, the level of the first power voltage VDD1 is increased, a voltage of the first node N1 is also increased. As the voltage of the first node N1 is increased, a voltage of the second node N2 is lowered. As the voltage of the second node N2 is lowered, the third NMOS transistor MN3 changes from an on state to an off state, and the second PMOS transistor MP2 changes from an off state to an on state. Thus, a current that flows through the second NMOS transistor MN2 is increased. Due to current mirroring, the same amount of current flows through the first NMOS transistor MN1, and thus, the increased voltage of the first node N1 is lowered toward a ground level. Accordingly, when the LCD apparatus enters an initial power-on state, the voltage of the first node N1 is increased as the level of the first power voltage VDD1 is increased, and then, is lowered when a second threshold value is reached, thereby forming a pulse in the form of a triangular wave. The voltage of the first node N1 is buffered by the first inverter IV1 and the second inverter IV2, and thus, a pulse having a form of a trapezoid is output as illustrated in FIG. 11B. Accordingly, when the LCD apparatus enters an initial power-on state, an on-sensing signal PON is toggled once. However, if the level of the first power voltage VDD1 is not increased from a level lower than the first threshold value as in period B, it is not recognized as entering a power-on state, and thus, the on-sensing signal PON is not toggled. The circuit illustrated in FIG. 11A is an exemplary structure of the power-on sensing unit 814 and may be variously changed according to design requirements.

Figure 12A:
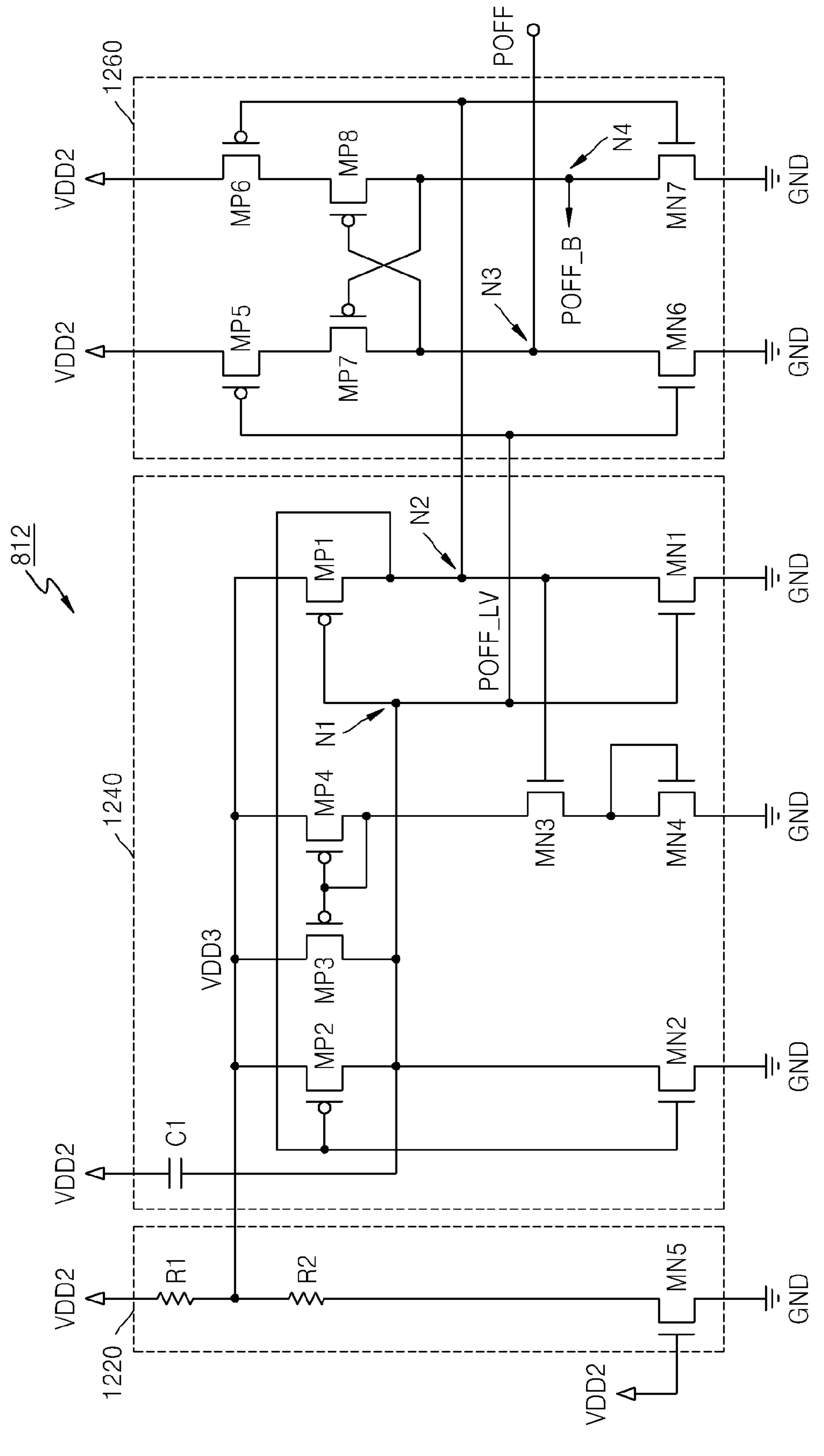
FIG. 12A is a circuit diagram of a power-off sensing unit illustrated in FIGS. 9 and 10, according to an exemplary embodiment.

FIG. 12A is a circuit diagram of the power-off sensing unit 812 illustrated in FIGS. 9 and 10, according to an exemplary embodiment. Referring to FIG. 12A, the power-off sensing unit 812 includes a driving voltage generation unit 1220, a power voltage sensing unit 1240, and a level conversion unit 1260. The driving voltage generation unit 1220 generates a third power voltage VDD3 for driving the power voltage sensing unit 1240, by using the second power voltage VDD2. In more detail, the driving voltage generation unit 1220 includes a first resistor R1, a second resistor R2, and a fifth NMOS transistor MN5. The power voltage sensing unit 1240 for sensing a level down of the second power voltage VDD2 includes a first capacitor C1, first through fourth PMOS transistors MP1 through MP4, and first through fourth NMOS transistors MN1 through MN4. Also, the level conversion unit 1260 includes fifth through eighth PMOS transistors MP5 through MP8, and sixth and seventh NMOS transistors MN6 and MN7. The circuit illustrated in FIG. 12A is an exemplary structure of the power-off sensing unit 812 and may be variously changed according to design requirements.

In the driving voltage generation unit 1220, the first resistor R1 has a first terminal connected to a source of the second power voltage VDD2, and a second terminal connected to a first terminal of the second resistor R2. The second resistor R2 has the first terminal connected to the second terminal of the first resistor R1, and a second terminal connected to a first terminal of the fifth NMOS transistor MN5. The fifth NMOS transistor MN5 has the first terminal connected to the second terminal of the second resistor R2, a second terminal that is grounded, and a gate terminal connected to the source of the second power voltage VDD2. As such, the third power voltage VDD3 may be generated by dividing the second power voltage VDD2 by using the first resistor R1 and the second resistor R2.

In the power voltage sensing unit 1240, the first PMOS transistor MP1 and the first NMOS transistor MN1 form one inverter so as to invert a voltage of a first node N1 and to output the inverted voltage to a second node N2. The first capacitor C1 has a first terminal connected to the source of the second power voltage VDD2, and a second terminal connected to the first node N1. The second PMOS transistor MP2 has a first terminal connected to a source of the third power voltage VDD3, a second terminal connected to the first node N1, and a gate terminal connected to the second node N2. The second NMOS transistor MN2 has a first terminal connected to the first node N1, a second terminal that is grounded, and a gate terminal connected to the second node N2.

The third and fourth PMOS transistors MP3 and MP4 form a current mirror. The third PMOS transistor MP3 has a first terminal connected to the source of the third power voltage VDD3, a second terminal connected to the first node N1, and a gate terminal connected to a gate terminal of the fourth PMOS transistor MP4. The fourth PMOS transistor MP4 has a first terminal connected to the source of the third power voltage VDD3, a second terminal connected to a first terminal of the third NMOS transistor MN3, and the gate terminal connected to the second terminal of the fourth PMOS transistor MP4. The third NMOS transistor MN3 has the first terminal connected to the second terminal of the fourth PMOS transistor MP4, a second terminal connected to a first terminal of the fourth NMOS transistor MN4, and a gate terminal connected to the second node N2. The fourth NMOS transistor MN4 has the first terminal and a gate terminal connected to the second terminal of the third NMOS transistor MN3, and a second terminal that is grounded.

In more detail, if the second power voltage VDD2 for driving the source driver is interrupted, the first node N1 has a voltage in a logic low level due to the first capacitor C1. As a result, the second node N2 has a voltage in a logic high level due to the inverter formed by using the first PMOS transistor MP1 and the first NMOS transistor MN1. Accordingly, the second NMOS transistor MN2 and the third NMOS transistor MN3 are turned on, and the third PMOS transistor MP3 and the fourth PMOS transistor MP4 are also turned on, and thus, the voltage of the first node N1 may be controlled not to become lower than a ground voltage GND. As such, if the second power voltage VDD2 for driving the source driver is interrupted as an LCD apparatus enters a power-off state, the power voltage sensing unit 1240 may control the voltage of the first node N1 not to become lower than the ground voltage GND so that a negative voltage is not provided to the gate terminals of the first PMOS transistor MP1 and the first NMOS transistor MN1. Accordingly, the first PMOS transistor MP1 and the first NMOS transistor MN1 are not damaged by a negative voltage.

On the other hand, if the second power voltage VDD2 for driving the source driver is provided, the first node N1 has a voltage in a logic high level due to the first capacitor C1. As a result, the second node N2 has a voltage in a logic low level due to the inverter formed by using the first PMOS transistor MP1 and the first NMOS transistor MN1. Accordingly, the first NMOS transistor MN1 and the second PMOS transistor MP2 are turned on, and thus, the voltage of the first node N1 may be controlled not to become higher than the second power voltage VDD2. As such, if the second power voltage VDD2 for driving the source driver is provided as the LCD apparatus is in a power-on state, the power voltage sensing unit 1240 may control the voltage of the first node N1 not to become higher than the third power voltage VDD3, and thus, a malfunction of the LCD apparatus may be prevented.

In the level conversion unit 1260, the fifth PMOS transistor MP5 has a first terminal connected to the source of the second power voltage VDD2, a second terminal connected to a first terminal of the seventh PMOS transistor MP7, and a gate terminal connected to the first node N1. The sixth PMOS transistor MP6 has a first terminal connected to the source of the second power voltage VDD2, a second terminal connected to a first terminal of the eighth PMOS transistor MP8, and a gate terminal connected to the second node N2. The seventh PMOS transistor MP7 has the first terminal connected to the second terminal of the fifth PMOS transistor MP5, a second terminal connected to the third node N3, and a gate terminal connected to a fourth node N4. The eighth PMOS transistor MP8 has the first terminal connected to the second terminal of the sixth PMOS transistor MP6, a second terminal connected to the fourth node N4, and a gate terminal connected to a third node N3. The sixth NMOS transistor MN6 has a first terminal connected to the third node N3, a second terminal that is grounded, and a gate terminal connected to the first node N1. The seventh NMOS transistor MN7 has a first terminal connected to the fourth node N4, a second terminal that is grounded, and a gate terminal connected to the second node N2.

In more detail, if the second power voltage VDD2 for driving the source driver is interrupted as the LCD apparatus enters a power-off state, that is, if the first node N1 has a voltage in a logic low level and the second node N2 has a voltage in a logic high level, the fifth PMOS transistor MP5, the seventh NMOS transistor MN7, and the seventh PMOS transistor MP7 are turned on so that the third node N3 has a voltage in a logic high level corresponding to the second power voltage VDD2, and the fourth node N4 has a voltage in a logic low level corresponding to the ground voltage GND. Accordingly, the level conversion unit 1260 outputs an off-sensing signal POFF that is boosted in a logic high level corresponding to the second power voltage VDD2. On the other hand, if the second power voltage VDD2 for driving the source driver is provided as the LCD apparatus is in a power-on state, that is, the first node N1 has a voltage in a logic high level and the second node N2 has a voltage in a logic low level, the sixth PMOS transistor MP6, the sixth NMOS transistor MN6, and the eighth PMOS transistor MP8 are turned on so that the third node N3 has a voltage in a logic low level corresponding to the ground voltage GND, and the fourth node N4 has a voltage in a logic high level corresponding to the second power voltage VDD2. Accordingly, the level conversion unit 1260 outputs the off sensing signal POFF in a logic low level corresponding to the ground voltage GND.

As described above, the second power voltage VDD2 for driving the source driver is interrupted as the LCD apparatus enters a power-off state, the level of the second power voltage VDD2 is lowered, and the third power voltage VDD3 for driving the power voltage sensing unit 1240 is also lowered. However, a signal POFF_LV of the first node N1, which is generated by using the third power voltage VDD3 in a voltage level relatively lower than that of the second power voltage VDD2, may not have a sufficient voltage level for controlling switches in the switching unit of the source driver (e.g., FIGS. 5 and 6). Accordingly, the level conversion unit 1260 may generate the off-sensing signal POFF having a sufficient voltage level for controlling the switching unit by inverting the voltage level of the signal POFF_LV of the first node N1 based on the second power voltage VDD2.

Figure 12B:
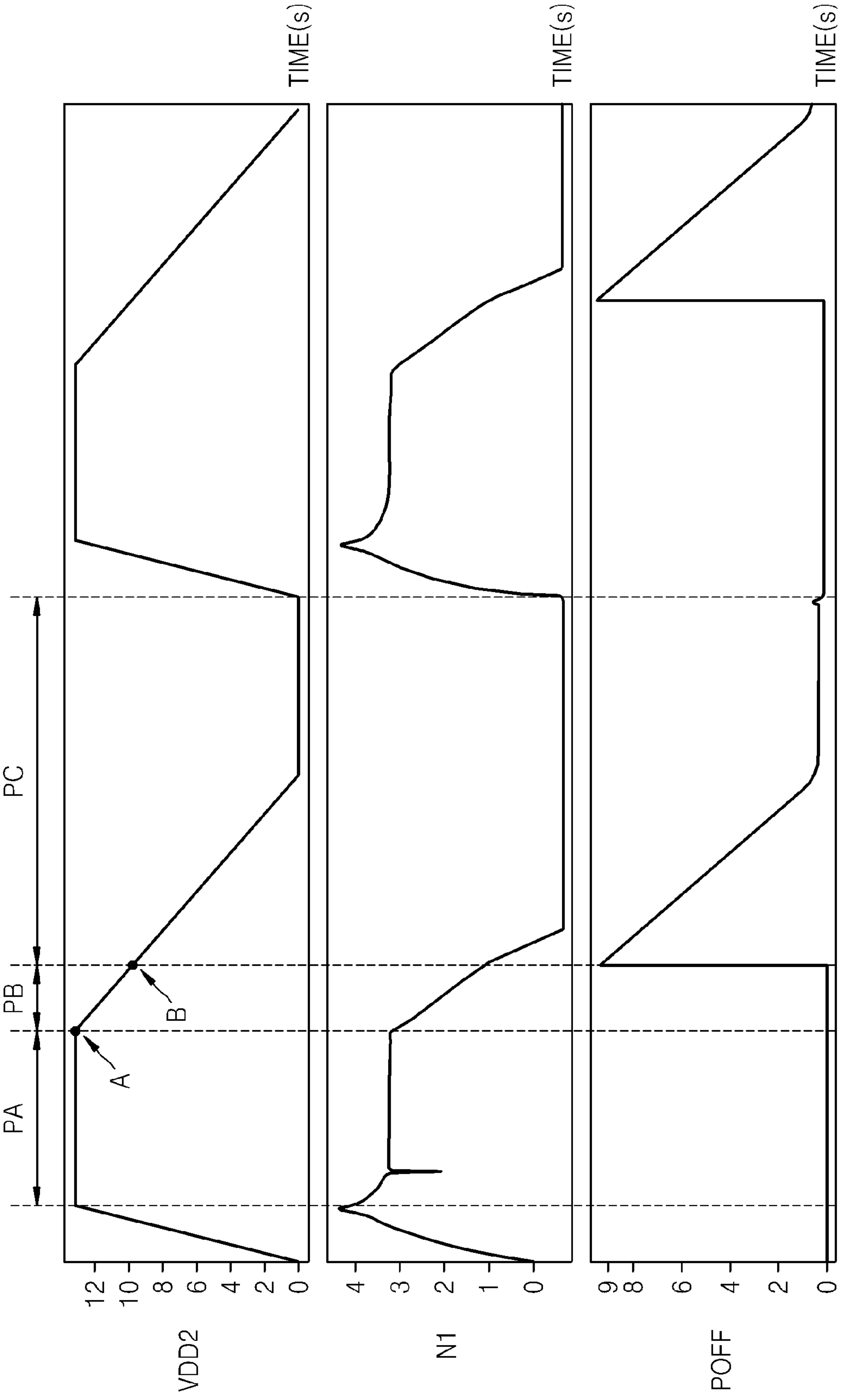
FIG. 12B is a graph showing a simulation result of the power-off sensing unit illustrated in FIG. 12A, according to an exemplary embodiment.

FIG. 12B is a graph showing a simulation result of the power-off sensing unit 812 illustrated in FIG. 12A. Referring to FIG. 12B, in a period PA when the second power voltage VDD2 for driving the source driver is provided as an LCD apparatus is in a power-on state, the first node N1 has a voltage in a logic high level, and the third node N3 generates an off-sensing signal POFF that is boosted in a logic low level.

Also, if the LCD apparatus enters a power-off state, and thus, the second power voltage VDD2 for driving the source driver circuit is interrupted, the off sensing signal POFF maintains the logic low level from a first time A when the level of the second power voltage VDD2 starts to drop to a second time B when the level of the second power voltage VDD2 reaches a preset voltage level, i.e., in a second period PB.

After that, the off sensing signal POFF is inverted to a logic high level at the second time B when the level of the second power voltage VDD2 reaches the preset voltage level. In a third period PC, the voltage of the first node N1 does not become a negative voltage due to the power voltage sensing unit 1240, and thus, the first PMOS transistor MP1 and the first NMOS transistor MN1 of the driving voltage generation unit 1220 are not damaged even when the power-off sensing unit 812 outputs the off-sensing signal POFF in a logic high level. Also, the off-sensing signal POFF has a waveform similar to that of the second power voltage VDD2 in the third period PC, because the level conversion unit 1260 generates the off-sensing signal POFF by inverting the voltage level of the signal POFF_LV output from the power voltage sensing unit 1240 based on the second power voltage VDD2.

Figure 13:
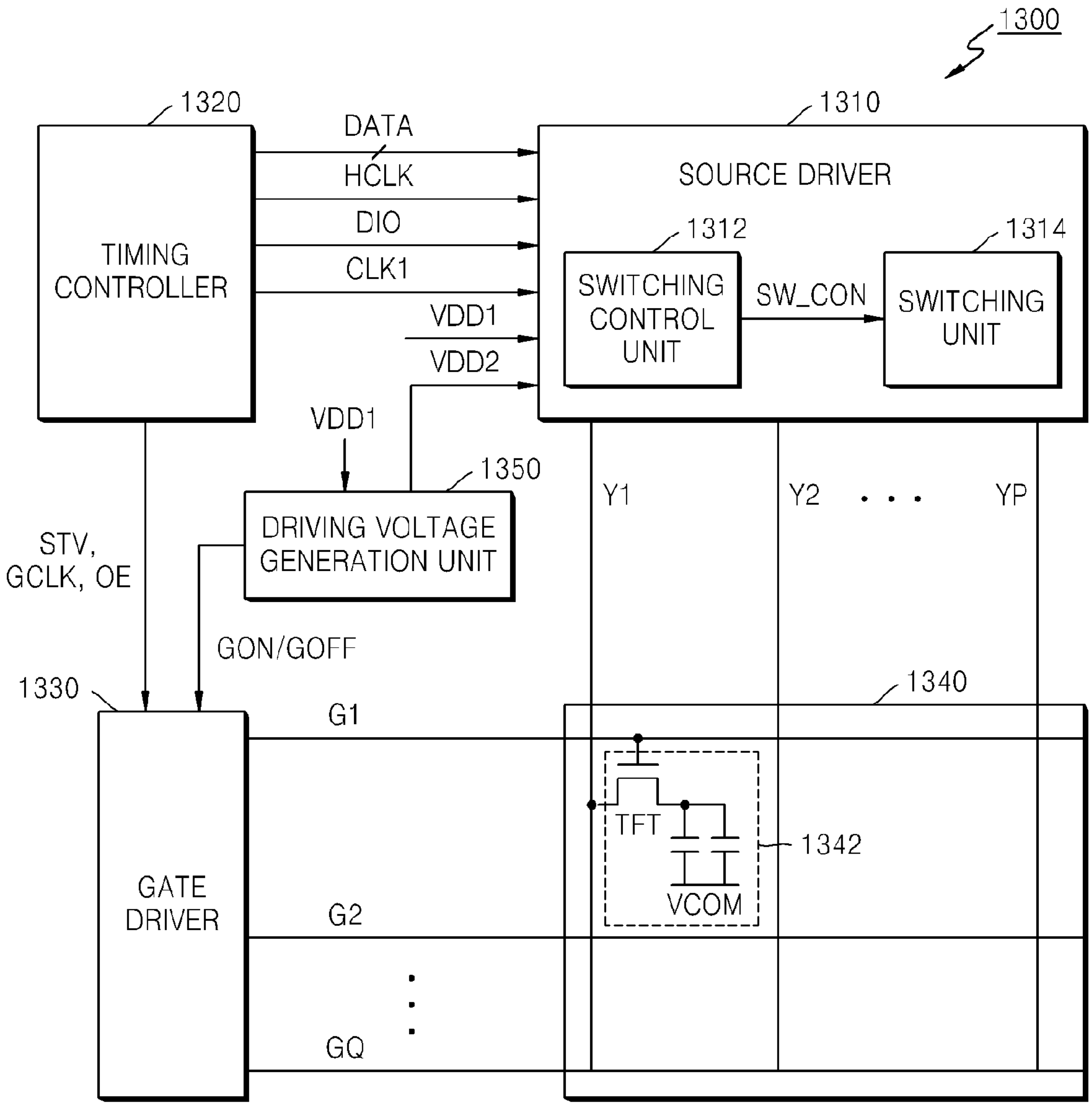
FIG. 13 is a block diagram of an LCD apparatus according to an exemplary embodiment.

FIG. 13 is a block diagram of an LCD apparatus 1300 according to an exemplary embodiment. Referring to FIG. 13, the LCD apparatus 1300 includes a source driver 1310, a gate driver 1330, a timing controller 1320, a liquid crystal panel 1340, and a driving voltage generation unit 1350.

The liquid crystal panel 1340 includes a plurality of gate lines G1 through GQ that extend in one direction, a plurality of source lines Y1 through YP that extend in a direction perpendicular to the gate lines G1 through GQ, and a pixel region 1342 where the gate lines G1 through GQ and the source lines Y1 through YP cross each other. The pixel region 1342 includes a plurality of pixels each including a thin film transistor TFT, a liquid crystal capacitor $C_{LC}$, and a storage capacitor $C_{ST}$. The thin film transistor TFT operates according to a gate driving signal applied to the gate lines G1 through GQ, and applies an analog grayscale signal, applied via the source lines Y1 through YP, to a pixel electrode so that electric fields at two ends of the liquid crystal capacitor $C_{LC}$ are changed. As such, the arrangement of liquid crystals (not shown) is changed, and thus, the transmittance of light provided from a backlight (not shown) may be adjusted.

The timing controller 1320 receives an image signal input from an external graphic controller (not shown), i.e., pixel data R, G and B, and control signals such as a horizontal synchronization signal Hsync, a vertical synchronization signal Vsync, a main clock signal CLK and a data enable signal DE (not shown). Also, the timing controller 1320 processes the pixel data R, G and B according to a condition for operating the liquid crystal panel 1340, generates a gate control signal and a source control signal, and transmits the gate control signal and the source control signal respectively to the gate driver 1330 and the source driver 1310. Here, the gate control signal includes, for example, a vertical start signal STV for indicating a start to output a gate turn-on voltage Von, a gate clock signal GCLK, and an output enable signal OE for controlling a duration of the gate turn-on voltage Von. Also, the source control signal includes, for example, a horizontal start signal DIO for indicating a start to transmit the pixel data R, G and B, an output control signal CLK1 for indicating to apply an analog grayscale signal to a corresponding source line, and a clock signal HCLK.

The driving voltage generation unit 1350 generates various driving voltages required to drive the liquid crystal panel 1340 by using a power voltage input from an external power device. The driving voltage generation unit 1350 receives a first power voltage VDD1 from an external device, and generates a second power voltage VDD2 to be provided to the source driver 1310, a gate turn-on voltage GON and a gate turn-off voltage GOFF to be provided to the gate driver 1330, and a common voltage Vcom to be provided to the liquid crystal panel 1340.

The gate driver 1330 provides the gate turn-on voltage GON and the gate turn-off voltage GOFF of the driving voltage generation unit 1350 to the gate lines G1 through GQ in response to the vertical start signal STV, the gate clock signal GCLK, and the output enable signal OE received from the timing controller 1320. As such, a corresponding thin film transistor TFT is controlled such that the analog grayscale signal output from the source driver 1310 is applied to a corresponding pixel.

The source driver 1310 generates an analog grayscale signal corresponding to digital image data in response to the source control signal output from the timing controller 1320, and applies the analog grayscale signal to the source lines Y1 through YP of the liquid crystal panel 1340. The source driver 1310 includes a switching unit 1314 and a switching control unit 1312. An example of the source driver 1310 is illustrated in FIG. 5.

Figure 14:
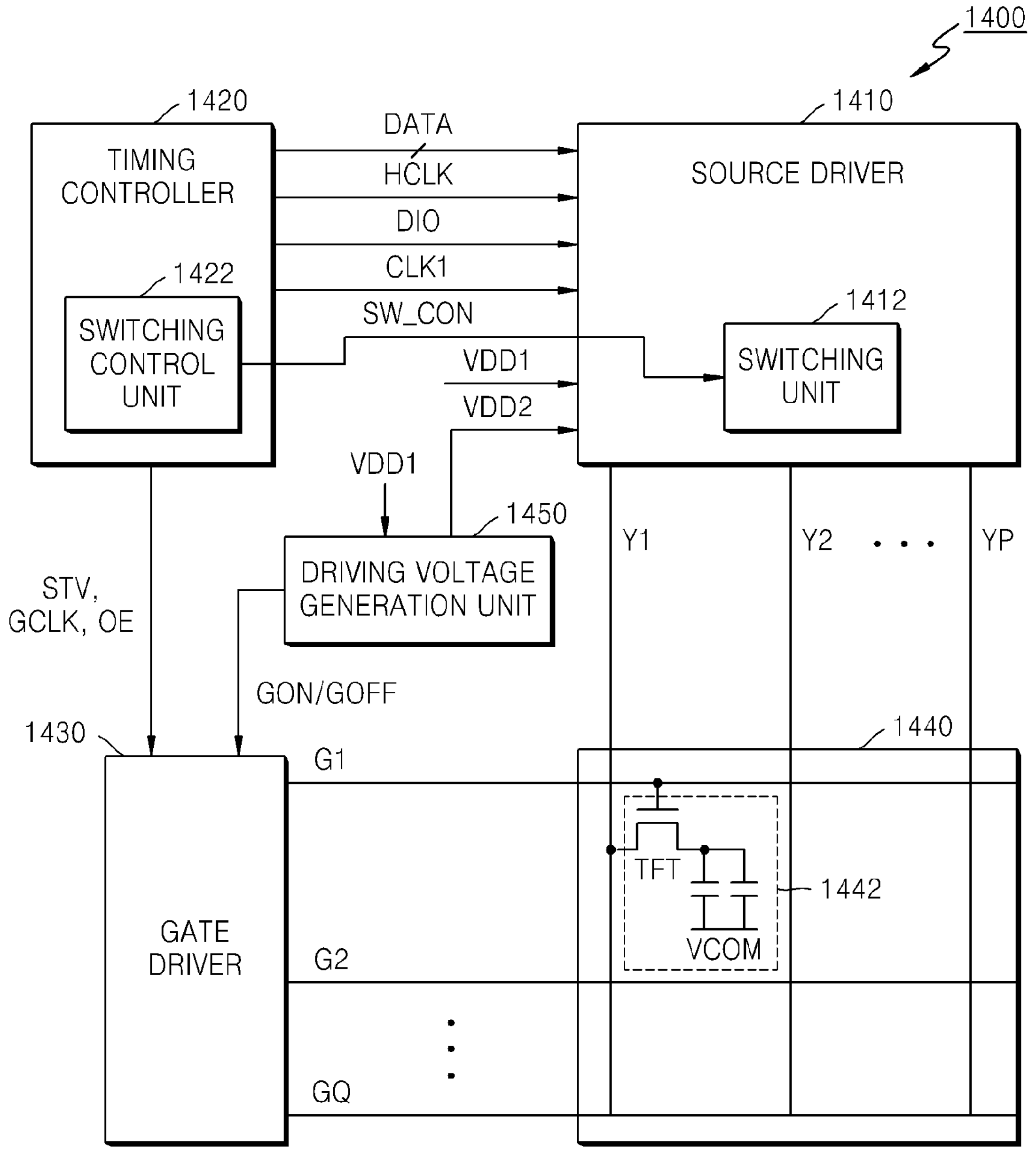
FIG. 14 is a block diagram of an LCD apparatus according to another exemplary embodiment.

FIG. 14 is a block diagram of an LCD apparatus 1400 according to another exemplary embodiment. Referring to FIG. 14, the LCD apparatus 1400 includes a source driver 1410, a gate driver 1430, a timing controller 1420, a liquid crystal panel 1440, and a driving voltage generation unit 1450. The source driver 1410 includes a switching unit 1412. The timing controller 1420 includes a switching control unit 1422. Accordingly, unlike the LCD apparatus 1300 illustrated in FIG. 13, in the LCD apparatus 1400, the source driver 1410 operates by receiving a switching control signal SW_CON from the timing controller 1420.

Figure 15:
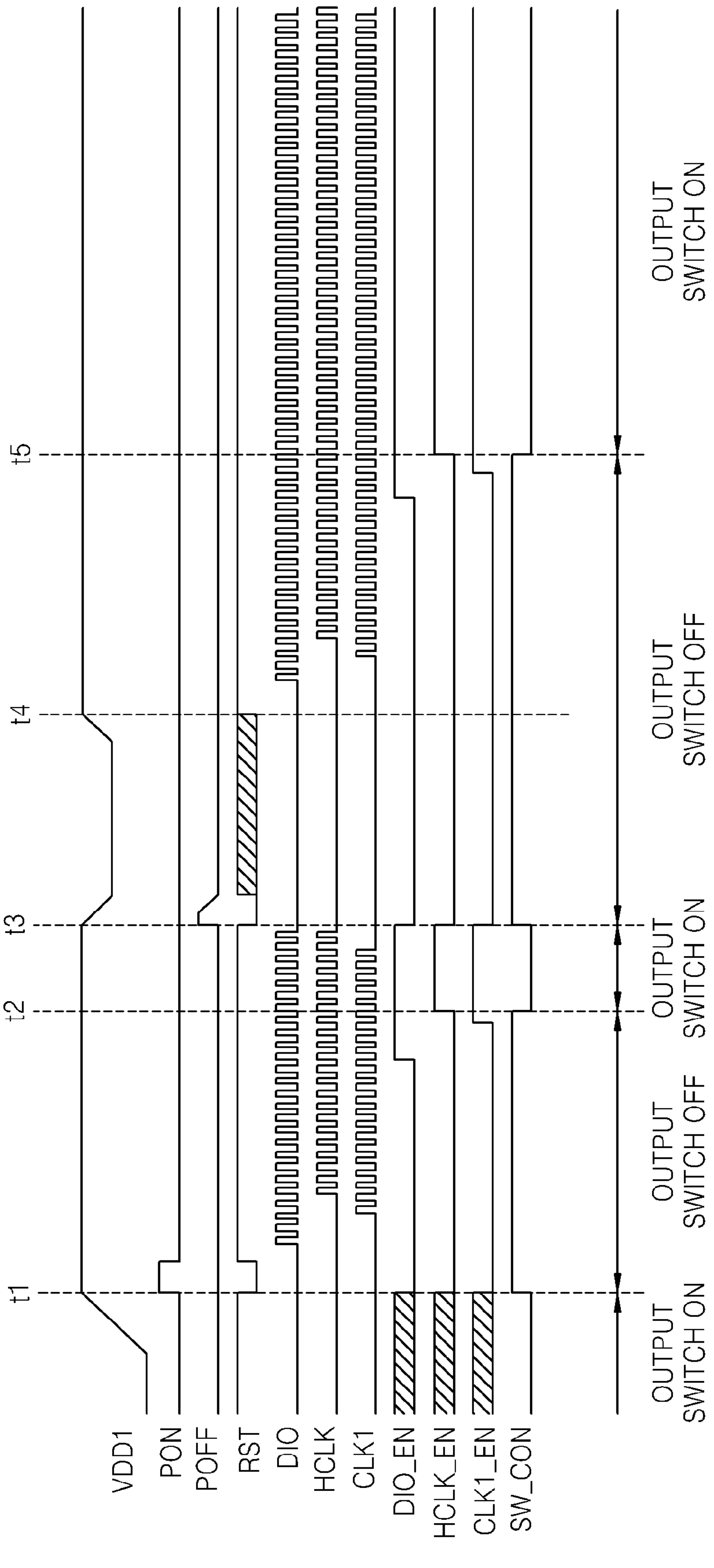
FIG. 15 is a timing diagram showing operation of the LCD apparatus illustrated in FIG. 13 or 14, according to an exemplary embodiment.

FIG. 15 is a timing diagram showing operation of the LCD apparatus 1300 or 1400 illustrated in FIG. 13 or 14, according to an exemplary embodiment. Referring to FIGS. 13 through 15, a first power voltage VDD1 is provided at a time t1, and is interrupted at a time t3. The first power voltage VDD1 is re-provided at a time t4. In this case, unlike the time t1, at the time t4, the first power voltage VDD1 is provided after the first power voltage VDD1 is interrupted and before the level of the first power voltage VDD1 is completely lowered to a ground level. At the time t2 and a time t5, digital image data DATA transmitted from the timing controller 1320 or 1420 is displayed on the liquid crystal panel 1340 or 1440.

Initially, when the first power voltage VDD1 is provided at the time t1, a power-on sensing unit (e.g., FIG. 11A) senses a level up of the first power voltage VDD1 and outputs an on-sensing signal PON in a high pulse. Since the LCD apparatus is in a power-on state when the first power voltage VDD1 is provided, a power-off sensing unit (e.g., FIG. 12A) does not generate an off-sensing signal POFF. Accordingly, a reset signal RST in a low pulse is generated in response to the on-sensing signal PON. After the first power voltage VDD1 is provided, control signals such as a horizontal start signal DIO, a clock signal HCLK, and an output control signal CLK1 are transmitted from the timing controller 1320 or 1420. However, although the first power voltage VDD1 is provided, a timing when the digital image data DATA is transmitted differs according to the type of the timing controller 1320 or 1420. Accordingly, all of the horizontal start signal DIO, the clock signal HCLK, and the output control signal CLK1 are monitored in order to check a timing when the digital image data DATA is validly transmitted regardless of the type of the timing controller 1320 or 1420. In more detail, these three control signals are to be toggled, and thus, the numbers of times that these three control signals are toggled are checked. However, according to the type of the timing controller 1320 or 1420, a control signal not to be toggled may exist from among the control signals. For example, if the horizontal start signal DIO is not toggled, a horizontal start signal DIO to be toggled in synchronization with the clock signal HCLK may be internally generated, and thus, the number of times that the horizontal start signal DIO is toggled may be checked. In this case, since the internally generated horizontal start signal DIO is synchronized with the clock signal HCLK, the clock signal HCLK may also be monitored by monitoring only the internally generated horizontal start signal DIO. A detection unit (e.g., 822 in FIG. 9)) that checks the number of times that toggling is performed is initialized in response to the reset signal RST in a low pulse. After that, if the three control signals to be toggled (the horizontal start signal DIO, the clock signal HCLK, and the output control signal CLK1) are toggled 16 times, first through third detection signals DIO_EN, HCLK_EN and CLK1_EN in a high level are output. A switching control signal SW_CON that is initialized to a high level in response to the reset signal RST is inverted to a low level if it is sensed that all of the three control signals (the horizontal start signal DIO, the clock signal HCLK, and the output control signal CLK1) are toggled 16 times. Accordingly, since the switching control signal SW_CON is in a high level in a period from the time t1 when the first power voltage VDD1 is provided to the time t2 when it is sensed that all of the three control signals are toggled 16 times, in the switching unit 1314 or 1412 of the source driver 1310 or 1410, an output switch is turned off and a charge sharing switch and a discharge switch are turned on so as to prevent unknown data from being displayed on the liquid crystal panel 1340 or 1440, and charges remaining in the liquid crystal panel 1340 and 1440 are rapidly discharged so as to prevent invalid data from being displayed. The switching control signal SW_CON is inverted to a low level at the time t2 when the timing controller 1320 or 1420 transmits valid data. Accordingly, in the switching unit 1314 or 1412 of the source driver 1310 or 1410, the output switch is turned off and the charge sharing switch and the discharge switch are turned on so that the digital image data DATA transmitted from the timing controller 1320 or 1420 is displayed on the liquid crystal panel 1340 or 1440.

When the first power voltage VDD1 is interrupted at the time t3, the power-off sensing unit senses a level down of the first power voltage VDD1 and outputs the off sensing signal POFF in a high pulse. Since the LCD apparatus is in a power-on state when the first power voltage VDD1 is interrupted, the power-on sensing unit does not generate the on-sensing signal PON. Accordingly, the reset signal RST in a low pulse is generated in response to the off-sensing signal POFF in a high pulse. In this case, the detection unit that checks the number of times that toggling is performed outputs a detection signal in a low level (is initialized) in response to the reset signal RST in a low pulse. The switching control signal SW_CON is set in a high level. Accordingly, in the switching unit 1314 or 1412, the output switch is turned off and the charge sharing switch and the discharge switch are turned on so as to prevent unknown data from being displayed on the liquid crystal panel 1340 or 1440, and charges remaining in the liquid crystal panel 1340 or 1440 are rapidly discharged so as to prevent invalid data from being displayed.

When the first power voltage VDD1 is provided at the time t4, i.e., when the first power voltage VDD1 is interrupted and then is provided before the level of the first power voltage VDD1 is dropped to a ground level, the power-on sensing unit is configured as illustrated in FIG. 11, although the first power voltage VDD1 is provided, unlike the time t1, the on sensing signal PON may not be generated. Since the LCD apparatus is in a power-on state when the first power voltage VDD1 is provided, the power-off sensing unit does not generate the off-sensing signal POFF. Accordingly, since the on sensing signal PON is not generated, the reset signal RST is not generated. In this case, the switching control signal SW_CON is not initialized to a low level. Also, a counter for counting the numbers of times that the control signals are toggled is not initialized. As such, the numbers of times that the control signals are toggled may be incorrectly checked and thus a malfunction may occur. However, the LCD apparatus 1300 or 1400 already initializes the counter for counting the numbers of times that the control signals are toggled, by using the reset signal RST when the first power voltage VDD1 is interrupted at the time t3, a malfunction of incorrectly checking the numbers of times that the control signals are toggled is prevented. Also, since the switching control signal SW_CON at the time t4 is already initialized to a high level at the time t3, the switching unit 1314 or 1412 also validly operates. The operation in a period between the times t4 and t5 is similar to that of the period between the times t1 and t2, and thus, is not repeatedly described here.

Figure 16:
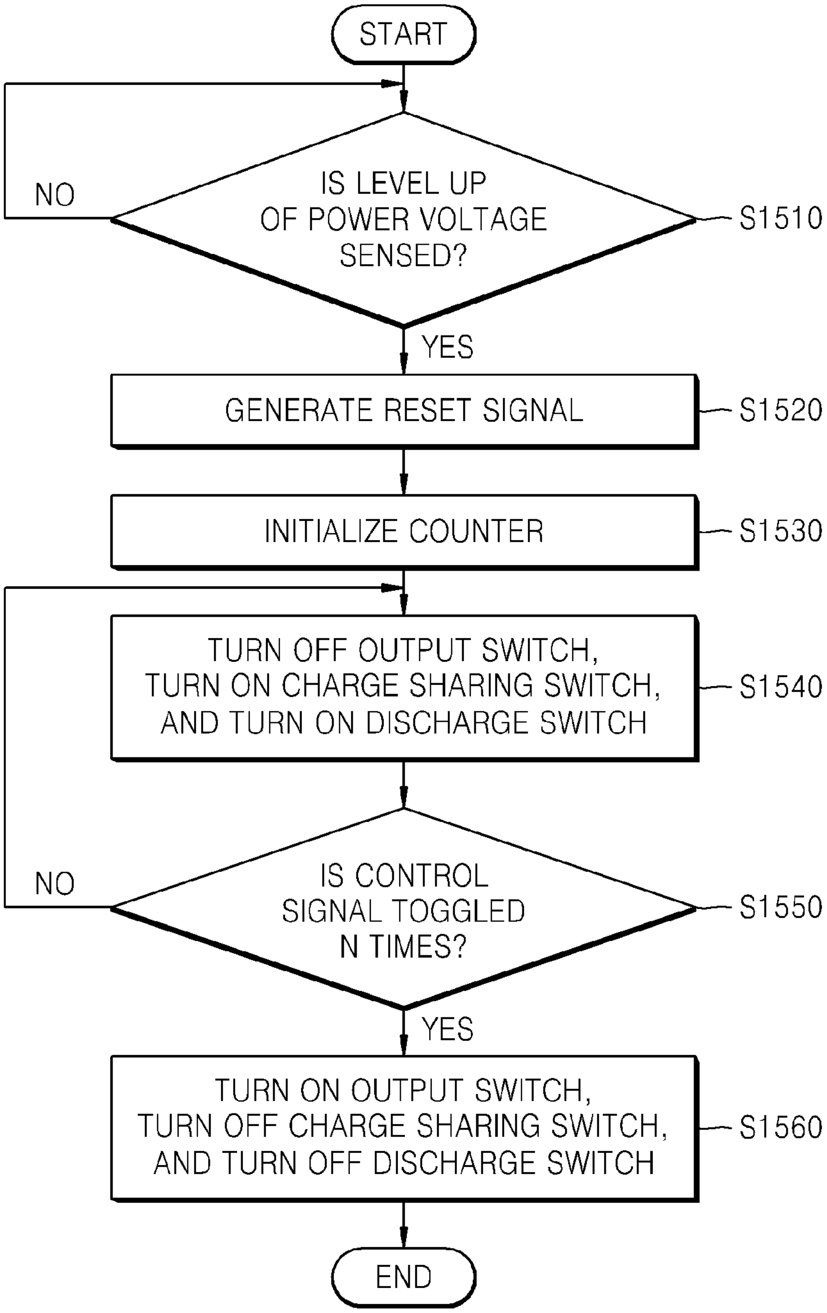
FIG. 16 is a flowchart of a liquid crystal panel driving method when power is provided (power-on), according to an exemplary embodiment.

FIG. 16 is a flowchart of a method of driving a liquid crystal panel when power is provided (power-on), according to an exemplary embodiment. Referring to FIG. 16, initially, a level up of a power voltage is checked in order to determine whether an LCD apparatus enters a power-on state (S1510). If the level up of the power voltage is sensed, a reset signal is generated (S1520). A counter for counting the number of times that a control signal is toggled is initialized in response to the reset signal (S1530). An output switch of a source driver is turned off in response to the reset signal so that connection between source lines of a liquid crystal panel and output terminals of output buffers of the source driver is blocked. Also, a charge sharing switch and a discharge switch are turned on so that the source lines are connected to each other and a current path is formed from the source lines to a ground terminal (S1540). In order to control the source driver, the number of times that at least one of a plurality of control signals generated by a timing controller is toggled is counted (S1550). If the number of times that the at least one control signal is toggled is counted as n times, the output switch of the source driver is turned on so that the source lines of the liquid crystal panel are connected to the output terminals of the output buffers of the source driver. Also, the charge sharing switch and the discharge switch are turned off so that the connection between the source lines is blocked and the current path from the source lines to the ground terminal is blocked (S1560).

Figure 17:
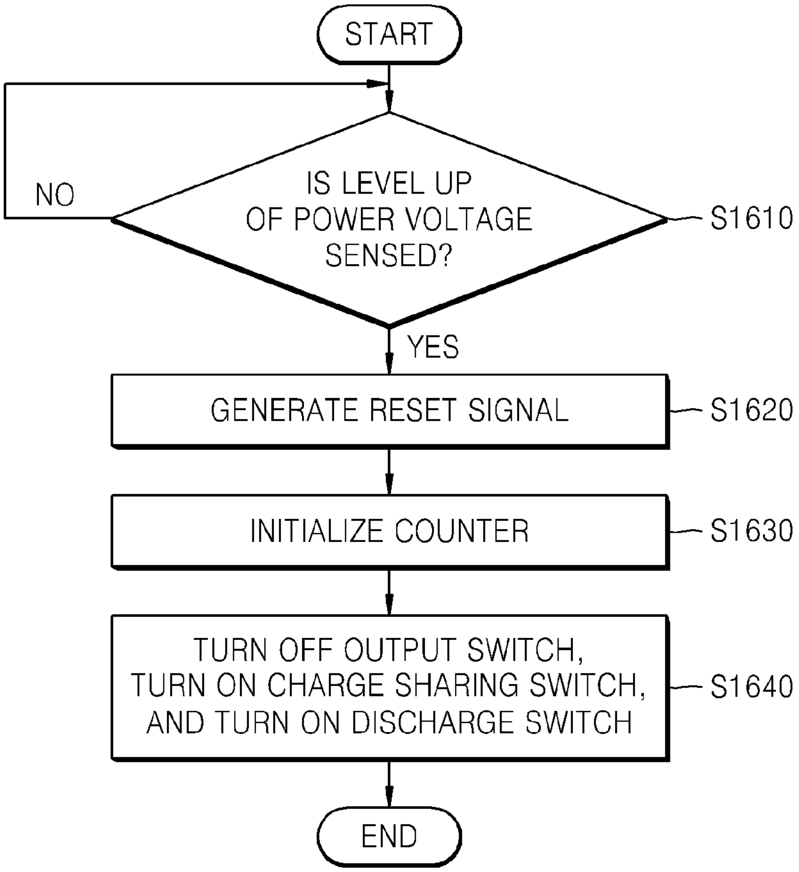
FIG. 17 is a flowchart of a liquid crystal panel driving method when power is interrupted (power-off), according to an exemplary embodiment.

FIG. 17 is a flowchart of a liquid crystal panel driving method when power is interrupted (power-off), according to an exemplary embodiment. Referring to FIG. 17, initially, a level down of a power voltage is checked in order to determine whether an LCD apparatus enters a power-off state (S1610). If the level down of the power voltage is sensed, a reset signal is generated (S1620). A counter for counting the number of times that a control signal is toggled is initialized in response to the reset signal (S1630). An output switch of a source driver is turned off in response to the reset signal so that connection between source lines of a liquid crystal panel and output terminals of output buffers of the source driver is blocked. Also, a charge sharing switch and a discharge switch are turned on so that the source lines are connected to each other and a current path is formed from the source lines to a ground terminal (S1640).

While the inventive concept has been particularly shown and described with reference to exemplary embodiments thereof, it will be understood that various changes in form and details may be made therein without departing from the spirit and scope of the following claims.

What is claimed is:

1. A source driver for driving source lines of a liquid crystal panel, the source driver comprising:

a plurality of output buffers;

a plurality of output pads which are connected to the liquid crystal panel;

a switching unit which is disposed between the plurality of output buffers and the plurality of output pads and controls an electrical connection state of the plurality of output pads in response to a switching control signal; and a switching control unit configured to generate the switching control signal, wherein the switching control unit comprises:

a power sensing unit which senses the level up or the level down of the power voltage and generates a reset signal; and a switching control signal generation unit which outputs the switching control signal in response to at least one control signal input from an external device after being initialized in response to the reset signal, and wherein, if a level up or a level down of a power voltage occurs, the switching unit prevents output signals of the plurality of output buffers from being transmitted to the liquid crystal panel via corresponding output pads and performs at least one of a charge sharing operation for connecting the plurality of output pads to each other and a discharging operation for providing a discharge path from the plurality of output pads to a ground terminal, in a preset period.

2. The source driver of claim 1, wherein the switching unit comprises:

a plurality of first switches each of which blocks connection between an output terminal of a corresponding output buffer of the plurality of output buffers and a corresponding output pad of the plurality of output pads if the level up or the level down of the power voltage occurs;

a plurality of second switches each of which connects two corresponding output pads of the plurality of output pads to each other if the level up or the level down of the power voltage occurs; and at least one third switch which connects the plurality of output pads to the ground terminal if the level up or the level down of the power voltage occurs.

3. The source driver of claim 2, wherein the plurality of first switches, the plurality of second switches, and the at least one third switch are controlled in response to the switching control signal.

4. The source driver of claim 1, wherein the switching control signal generation unit is initialized in response to the reset signal and inverts a previous output level after the at least one control signal is toggled n times, where n is a natural number.

5. The source driver of claim 4, wherein the power sensing unit comprises:

a power-on sensing unit which generates an on-sensing signal in response to a level up of a first power voltage;

a power-off sensing unit which generates an off-sensing signal in response to a level down of a second power voltage;

a first level conversion unit which converts a voltage level of the off-sensing signal into a level of the first power voltage; and a NOR gate which performs a NOR operation on an output of the power-on sensing unit and an output of the first level conversion unit, and generates the reset signal.

6. The source driver of claim 5, wherein the switching control signal generation unit comprises:

a detection unit which is initialized in response to the reset signal and inverts the previous output level after the at least one control signal is toggled n times;

a second level conversion unit which converts an output level of the detection unit into a level of the second power voltage; and an OR gate which performs an OR operation on an output of the power-off sensing unit and an output of the second level conversion unit, and generates the switching control signal.

7. The source driver of claim 6, wherein the switching control signal generation unit operates in response to one control signal among the at least one control signal, and wherein the detection unit comprises:

a counter which is initialized in response to the reset signal and controls the previous output level to be inverted whenever the one control signal is toggled n times; and a flip-flop which is initialized in response to the reset signal and inverts the previous output level in response to an output of the counter.

8. The source driver of claim 6, wherein the at least one control signal comprises a plurality of control signals, and the switching control signal generation unit operates in response to the plurality of control signals, and wherein the detection unit comprises:

a plurality of counters each of which is initialized in response to the reset signal and controls a corresponding previous output level to be inverted whenever a corresponding control signal among the plurality of controls signals is toggled n times;

a plurality of flip-flops each of which is initialized in response to the reset signal and inverts the corresponding previous output level in response to an output of a corresponding counter of the plurality of counters; and a NAND gate which performs a NAND operation on outputs of the plurality of flip-flops.

* * * * *